United States Patent
Matsushita et al.

(10) Patent No.: US 8,606,931 B2
(45) Date of Patent: Dec. 10, 2013

(54) COMMUNICATION SYSTEM, COMMUNICATION CONTROL DEVICE AND COMMUNICATION CONTROL METHOD

(75) Inventors: Takashi Matsushita, Ichinomiya (JP); Yasuhiro Kudo, Ichinomiya (JP); Makoto Nishida, Nagoya (JP); Hirokazu Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 614 days.

(21) Appl. No.: 12/886,772

(22) Filed: Sep. 21, 2010

(65) Prior Publication Data

US 2011/0078315 A1 Mar. 31, 2011

(30) Foreign Application Priority Data

Sep. 30, 2009 (JP) ................................. 2009-228522

(51) Int. Cl.
*G06F 15/16* (2006.01)
(52) U.S. Cl.
USPC ........................... 709/227; 709/225; 709/226
(58) Field of Classification Search
USPC ....................................................... 709/227
See application file for complete search history.

(56) References Cited

U.S. PATENT DOCUMENTS

| | | | | |
|---|---|---|---|---|
| 7,107,348 | B2* | 9/2006 | Shimada et al. | 709/229 |
| 7,760,744 | B1* | 7/2010 | Mohaban | 370/401 |
| 7,933,273 | B2 | 4/2011 | Takeda et al. | |
| 8,144,704 | B2 | 3/2012 | Miyajima et al. | |
| 2007/0067046 | A1* | 3/2007 | Berg | 700/1 |
| 2007/0288606 | A1* | 12/2007 | Kito et al. | 709/220 |
| 2008/0062977 | A1* | 3/2008 | Kaneko et al. | 370/389 |
| 2008/0232362 | A1* | 9/2008 | Miyajima et al. | 370/389 |
| 2008/0288580 | A1* | 11/2008 | Wang et al. | 709/203 |
| 2009/0259943 | A1* | 10/2009 | Barsook et al. | 715/730 |
| 2010/0070623 | A1* | 3/2010 | Sawada | 709/224 |
| 2010/0217837 | A1* | 8/2010 | Ansari et al. | 709/218 |
| 2011/0200009 | A1 | 8/2011 | Takeda et al. | |

FOREIGN PATENT DOCUMENTS

| | | |
|---|---|---|
| JP | 2005-108899 | 4/2006 |
| JP | A-2008-236297 | 10/2008 |
| JP | A-2010-535004 | 11/2010 |
| WO | WO 2009/018004 A1 | 2/2009 |

OTHER PUBLICATIONS

Office Action issued in Japanese Patent Application No. 2009-228522 dated Feb. 5, 2013 (with translation).

* cited by examiner

*Primary Examiner* — Patrice Winder
*Assistant Examiner* — Eyob Hagos
(74) *Attorney, Agent, or Firm* — Oliff & Berridge, PLC

(57) ABSTRACT

A communication system comprises a NAT device, a terminal device, and a communication control device. The communication control device comprises a first storage unit that stores a NAT address, a first receiving unit that receives a type request signal, a first determination unit that determines whether the NAT address matching a source IP address of the type request signal is stored in the first storage unit, and a first transmitting unit that transmits the type information associated with the NAT address matching the source IP address to the terminal device. The terminal device comprises a second transmitting unit that transmits the type request signal, a second receiving unit that receives the type information, and a communication control unit that performs Peer to Peer communication with another terminal device that is subordinate to another NAT device by performing communication using a method to establish communication based on the received type information.

14 Claims, 20 Drawing Sheets

COMMUNICATION SYSTEM, COMMUNICATION CONTROL DEVICE AND COMMUNICATION CONTROL METHOD

CROSS-REFERENCE TO RELATED APPLICATION

This application claims priority to Japanese Patent Application No. 2009-228522, filed Sep. 30, 2009, the disclosure of which is hereby incorporated by reference in its entirety.

BACKGROUND

The present disclosure relates to a communication system, a communication control device and a communication control method that enable communication between terminal devices that are subordinate to NAT devices.

There are cases in which Peer to Peer (P2P) communication is performed between terminal devices that are subordinate to different devices that are equipped with a Network Address Translation (NAT) function (such as a NAT router etc. Hereinafter, the device equipped with the NAT function is referred to as "NAT device.") In this case, it is necessary for the terminal device to identify a port number stored in the NAT device and transmit a packet addressed to the identified port number. A method is known in which a server device manages the port number stored in the NAT device, and the terminal device acquires the port number from the server device.

SUMMARY

In the above-described method, the server device does not manage type information of the NAT device. Therefore, the terminal device cannot acquire a type of the NAT device that is connected to another terminal device (communication partner terminal device). For that reason, the terminal device cannot select an appropriate communication method to start of P2P communication in a short time.

Various exemplary embodiments of the general principles herein provide a communication system, a communication control device and a communication control method that enable P2P communication to be rapidly started between terminal devices by having a server device manage type information of a NAT device.

Exemplary embodiments provide a communication system comprises a NAT device that has a network address translation (NAT) function, a terminal device that is subordinate to the NAT device, and a communication control device that connects to the NAT device via an external network. The communication control device comprises a first storage unit, a first receiving unit, a first determination unit, and a first transmitting unit. The first storage unit stores a NAT address, which is a global IP address of the NAT device, in association with type information that classifies the NAT device. The first receiving unit receives, from the terminal device, a type request signal that requests acquisition of the type information of the NAT device to which the terminal device is subordinate. The first determination unit determines, in a case where the type request signal is received by the first receiving unit, whether the NAT address matching a source IP address of the type request signal is stored in the first storage unit. The first transmitting unit transmits, in a case where it is determined by the first determination unit that the NAT address matching the source IP address is stored in the first storage unit, the type information associated with the NAT address matching the source IP address to the terminal device that has transmitted the type request signal. The terminal device comprises a second transmitting unit, a second receiving unit, and a communication control unit. The second transmitting unit transmits the type request signal to the communication control device. The second receiving unit receives the type information transmitted from the communication control device in response to the type request signal transmitted by the second transmitting unit. The communication control unit performs, in a case where the type information has been received by the second receiving unit, Peer to Peer communication with another terminal device that is subordinate to another NAT device by performing communication using a method to establish communication, the method being determined based on the received type information.

Exemplary embodiments also provide a communication control device that connects to a NAT device via an external network, the NAT device having network address translation (NAT) function comprises a seventh transmitting unit, an analysis unit, an eighth transmitting unit, a seventh receiving unit, and a third storage control unit. The first storage unit stores a NAT address, which is a global IP address of the NAT device and type information that classifies the NAT device, the NAT address and the type information being stored in association with each other. The first receiving unit receives a type request signal from a terminal device that is subordinate to the NAT device, the type request signal requesting acquisition of the type information of the NAT device. The first determination unit determines, in a case where the type request signal is received by the first receiving unit, whether the NAT address matching a source IP address of the type request signal is stored in the first storage unit. The first transmitting unit transmits, in a case where it is determined by the first determination unit that the NAT address matching the source IP address is stored in the first storage unit, to the terminal device that has transmitted the type request signal, the type information that is associated with the NAT address matching the source IP address.

Exemplary embodiments further provide a communication control method to perform communication between terminal devices that are subordinate to different NAT devices that have a network address translation (NAT) function, the communication control method comprises the step of transmitting, by the terminal device to the communication control device via the NAT device, a type request signal that requests acquisition of type information that classifies the NAT device. The communication control method comprises the step of receiving, by the communication control device, the type request signal from the terminal device that is subordinate to the NAT device. The communication control method comprises the step of determining, in a case where the communication control device has received the type request signal, whether a NAT address matching a source IP address of the type request signal is stored in a first storage unit, the NAT address being a global IP address of the NAT device, the NAT address and the type information being stored in association with each other in the first storage unit. The communication control method comprises the step of transmitting, by the communication control device to the terminal device that has transmitted the type request signal, the type information associated with the NAT address matching a source IP, in the case where it is determined that the NAT address matching the source IP address is stored in the first storage unit. The communication control method comprises the step of receiving, by the terminal device, the type information transmitted from the communication control device. The communication control method comprises the step of performing Peer to Peer communication, by the terminal device, with other terminal devices, in a case where the type information has been received, by performing communication using a method to establish communication that is determined based on the received type information.

BRIEF DESCRIPTION OF THE DRAWINGS

Exemplary embodiments will be described below in detail with reference to the accompanying drawings in which.

DETAILED DESCRIPTION

Figure 1:
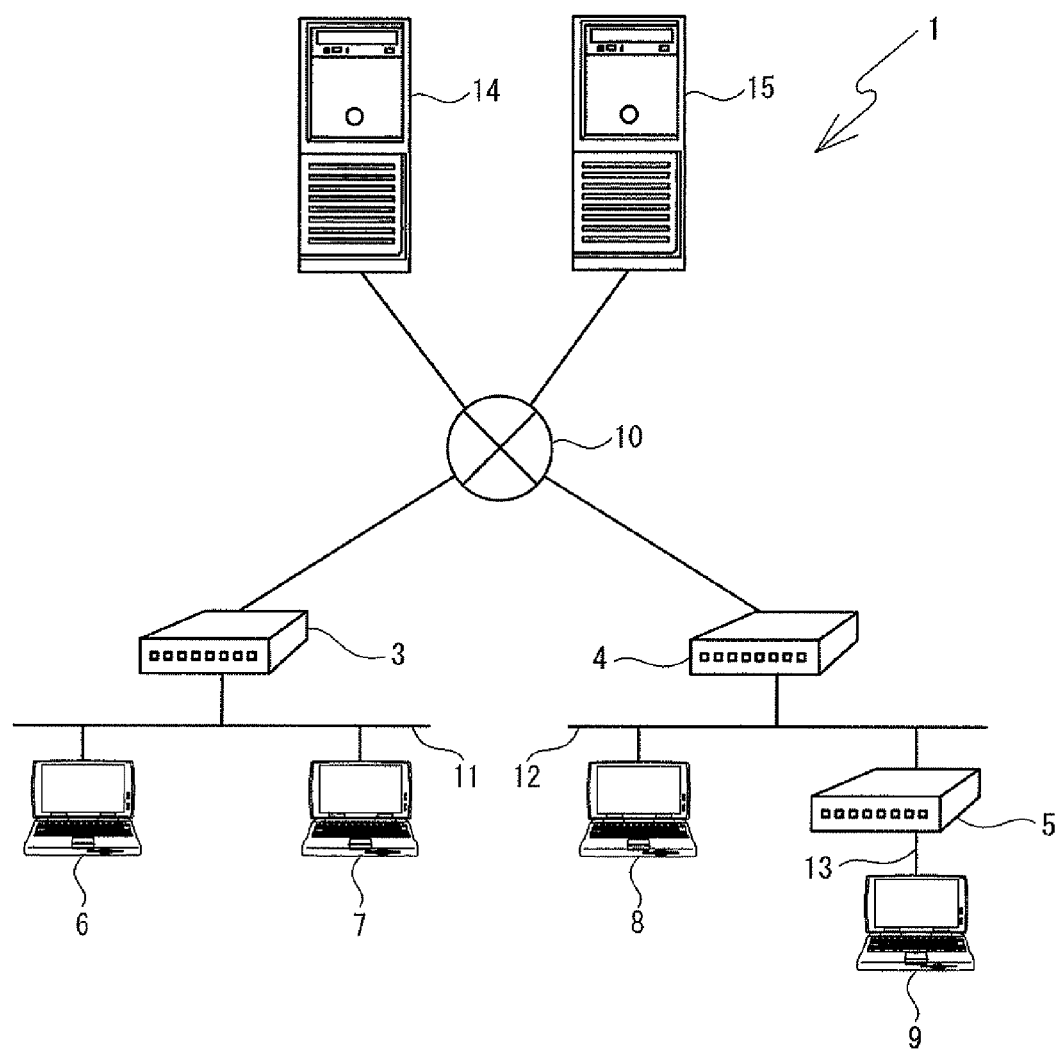
FIG. 1 is a schematic diagram that shows an overview of a communication system 1.

Hereinafter, an overview of a communication system 1 will be explained with reference to FIG. 1. The communication system 1 includes a communication control device 14, a communication management device 15, NAT devices 3 to 5 and terminal devices 6 to 9. The communication control device 14, the communication management device 15 and the NAT devices 3 and 4 are connected to an Internet 10. The NAT device 5 is connected to a LAN 12 that is subordinate to the NAT device 4. The terminal devices 6 and 7 are connected to a LAN 11 that is subordinate to the NAT device 3. The terminal device 8 is connected to the LAN 12 that is subordinate to the NAT device 4. The terminal device 9 is connected to a LAN 13 that is subordinate to the NAT device 5.

The communication control device 14 provides to the terminal devices 6 to 9 information that is necessary in order to enable P2P communication between the terminal devices 6 to 9. A call control server or a Simple Traversal of UDP through NATs (STUN) server, for example, can be used as the communication control device 14. The communication management device 15 stores a communication status of the P2P communication performed between the terminal devices 6 to 9. In a case in which video conferencing is performed between the terminal devices 6 to 9, a video conferencing management server, which can recognize the communication status between the terminal devices 6 to 9, can be used as the communication management device 15, for example.

Based on information acquired from the communication control device 14, each of the terminal devices 6 to 9 can perform P2P communication with another of the terminal devices. A PC can be used, for example, as the terminal devices 6 to 9. The NAT devices 3 to 5 are devices that are provided with NAT functions. A NAT router can be used, for example, as the NAT devices 3 to 5.

When P2P communication is performed between the terminal devices 6 to 9, sometimes packets being transmitted and received between the terminal devices 6 to 9 are blocked by the NAT devices 3 to 5. This is because, when the NAT devices 3 to 5 have received packets from the Internet 10 side (from the LAN 12 side in the case of the NAT device 5), the NAT devices 3 to 5 only forward specified packets to the LAN 11 and LAN 12 side (the LAN 13 side in the case of the NAT device 5), and all other packets are not forwarded.

When P2P communication is started between the terminal devices 6 to 9, the terminal devices 6 to 9 acquire a NAT type (Cone NAT, Symmetric NAT etc.). The NAT type is a type of a forwarding protocol of the NAT devices 3 to 5. A method to establish communication that is required to start P2P communication is identified for each of the NAT types. UDP hole punching and UDP multi-hole punching can be used as methods to establish communication, for example. The terminal devices 6 to 9 store a list on which the NAT type and the method to establish communication are associated with each other. By referring to the list, the terminal devices 6 to 9 can identify the method to establish communication. The terminal devices 6 to 9 perform communication based on the identified method. In this way, P2P communication becomes possible between the terminal devices 6 to 9. The terminal devices 6 to 9 may use another method to identify the method to establish communication. For example, the terminal devices 6 to 9 may identify the method to establish communication that is associated with the acquired NAT type, by inquiring to another control device (including the communication control device 14 and the communication management device 15).

In the present disclosure, the NAT types of the NAT devices 3 to 5 are managed by the communication control device 14. When starting P2P communication, the terminal devices 6 to 9 acquire the NAT type by performing communication with the communication control device 14. The terminal devices 6 to 9 determine the method to establish communication based on the acquired NAT type and perform communication, and then perform P2P communication. The terminal devices 6 to 9 can rapidly acquire the NAT type and thus P2P communication can be rapidly started.

A variety of other known networks (a LAN, a WAN, a leased line etc.) may be used instead of the Internet 10. The LANs 11 to 13 may be WANs or may be leased lines. Three or more NAT devices may be located on paths between the communication control device 14 and the terminal devices 6 to 9.

Figure 2:
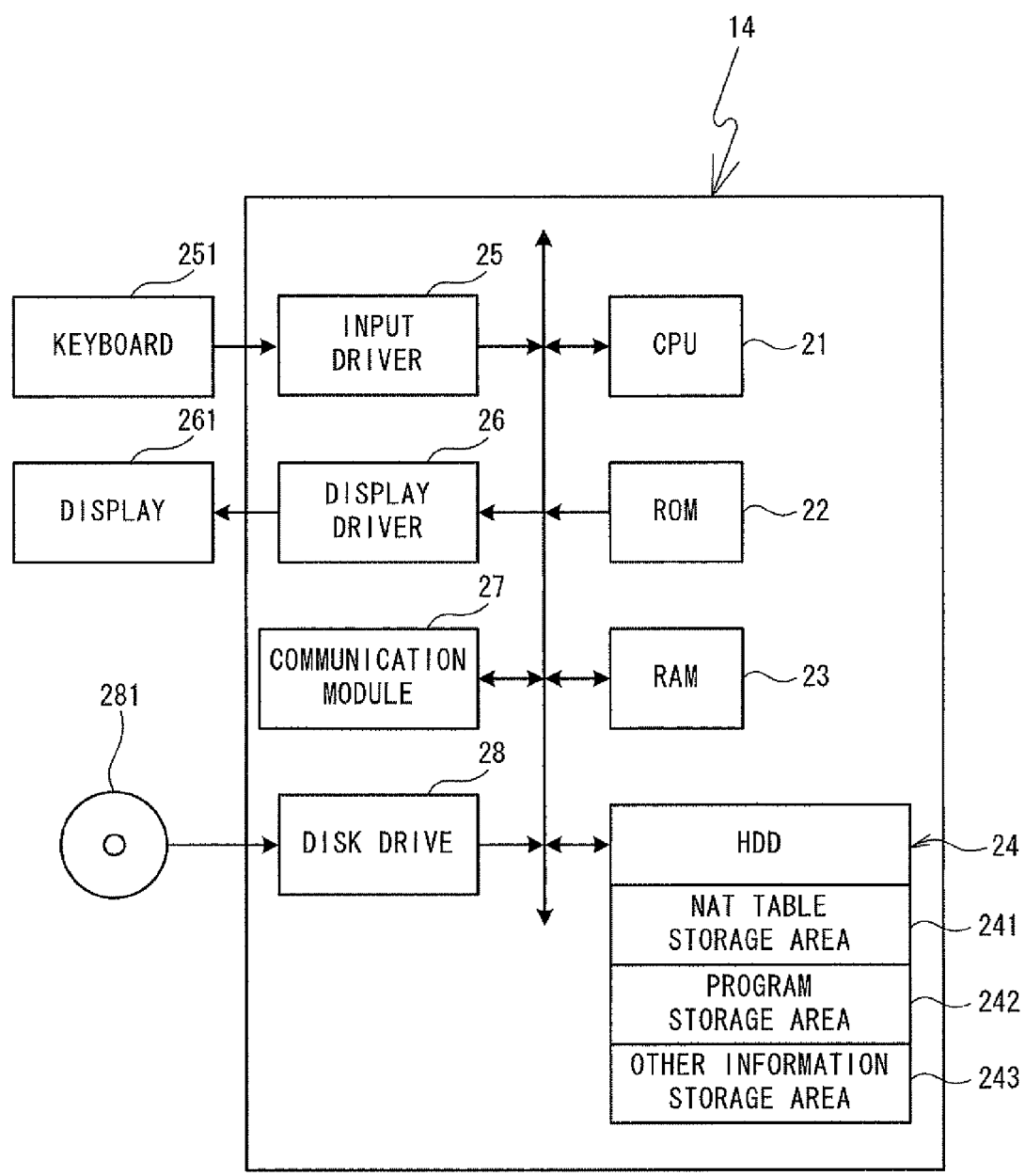
FIG. 2 is a block diagram that shows an electrical configuration of a communication control device 14.

An electrical configuration of the communication control device 14 will be explained with reference to FIG. 2. The communication control device 14 includes a CPU 21, a ROM 22, a RAM 23 and an HDD 24. The CPU 21 controls communication with the NAT devices 3 to 5 and the terminal devices 6 to 9. At least a boot program and default parameters are stored in the ROM 22. At least temporary data generated during processing by the CPU 21 is stored in the RAM 23. The HDD 24 includes a NAT table storage area 241, a program storage area 242 and other information storage area 243. A NAT table is stored in the NAT table storage area 241, and information of the NAT types of the NAT devices 3 to 5 is stored in the NAT table. Programs of the CPU 21 are stored in the program storage area 242. The CPU 21 is electrically connected to the ROM 22, the RAM 23 and the HDD 24. The CPU 21 can access the storage areas of the ROM 22, the RAM 23 and the HDD 24.

The communication control device 14 is provided with an input driver 25. The input driver 25 detects information that is input via a keyboard 251. The CPU 21 is electrically connected to the input driver 25. The input driver 25 is electrically connected to the keyboard 251. The CPU 21 can recognize the information that is input via the keyboard 251. The communication control device 14 is provided with a display driver 26. The display driver 26 performs control to display images on a display 261. The CPU 21 is electrically connected to the display driver 26. The display driver 26 is electrically connected to the display 261. The CPU 21 can cause a desired image to be displayed on the display 261.

The communication control device 14 is provided with a communication module 27. The communication module 27 enables communication via the Internet 10. The CPU 21 is electrically connected to the communication module 27. The CPU 21 can perform communication through the Internet 10. The communication control device 14 is provided with a disk drive 28. The disk drive 28 is a drive device to access information that is stored in a storage medium 281. The CPU 21 is electrically connected to the disk drive 28. When the recording medium 281 is inserted in the disk drive 28, the CPU 21 can access the information that is stored in the storage medium 281. A program executed by the CPU 21, for example, is stored in the storage medium 281. When the communication control device 14 connects to the communication system 1, the program is read from the storage medium 281 and is stored in the program storage area 242 of the HDD 24.

A NAT table 2411, which is an example of the NAT table stored in the HDD 24, will be explained with reference to FIG. 3. An ID, the NAT type, a GIP, a GPort, a LIP, an LPort, an identifier key and usability information are stored in the NAT table 2411. The ID is the ID of each of the NAT devices 3 to 5 within the communication system 1. The GIP is a global IP address set on the Internet 10 side of the NAT devices 3 and 4 (on the LAN 12 side of the NAT device 5). The GPort is a global port number set on the Internet 10 side of the NAT devices 3 and 4 (on the LAN 12 side of the NAT device 5). The LIP is an IP address set on the LAN 11 and LAN 12 side of the NAT devices 3 and 4 (on the LAN 13 side of the NAT device 5). The LPort is a port number set on the LAN 11 and LAN 12 side of the NAT devices 3 and 4 (on the LAN 13 side of the NAT device 5). The identifier key is identification information to identify the terminal device subordinate to the same NAT device. The usability information is information indicating whether or not the information in the table is usable.

Figure 3:
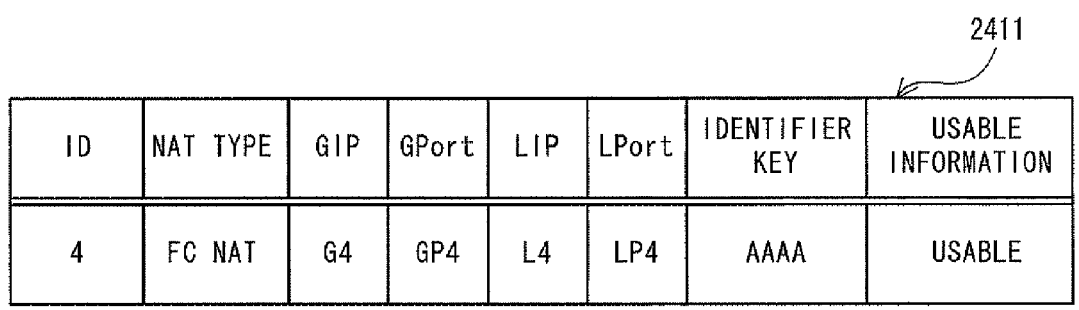
FIG. 3 is a schematic diagram that shows a NAT table 2411.

In FIG. 3, information relating to the NAT device with the ID "4" is stored. This NAT device corresponds to the NAT device 4 in FIG. 1. The NAT type is "FC NAT" (Full Cone NAT). The GIP is "G4." The GPort is "GP4." The LIP is "L4." The LPort is "LP4." The identifier key is "AAAA." Information indicating that the information in the table can be used ("USABLE" in FIG. 3) is stored as the usability information.

Figure 4:
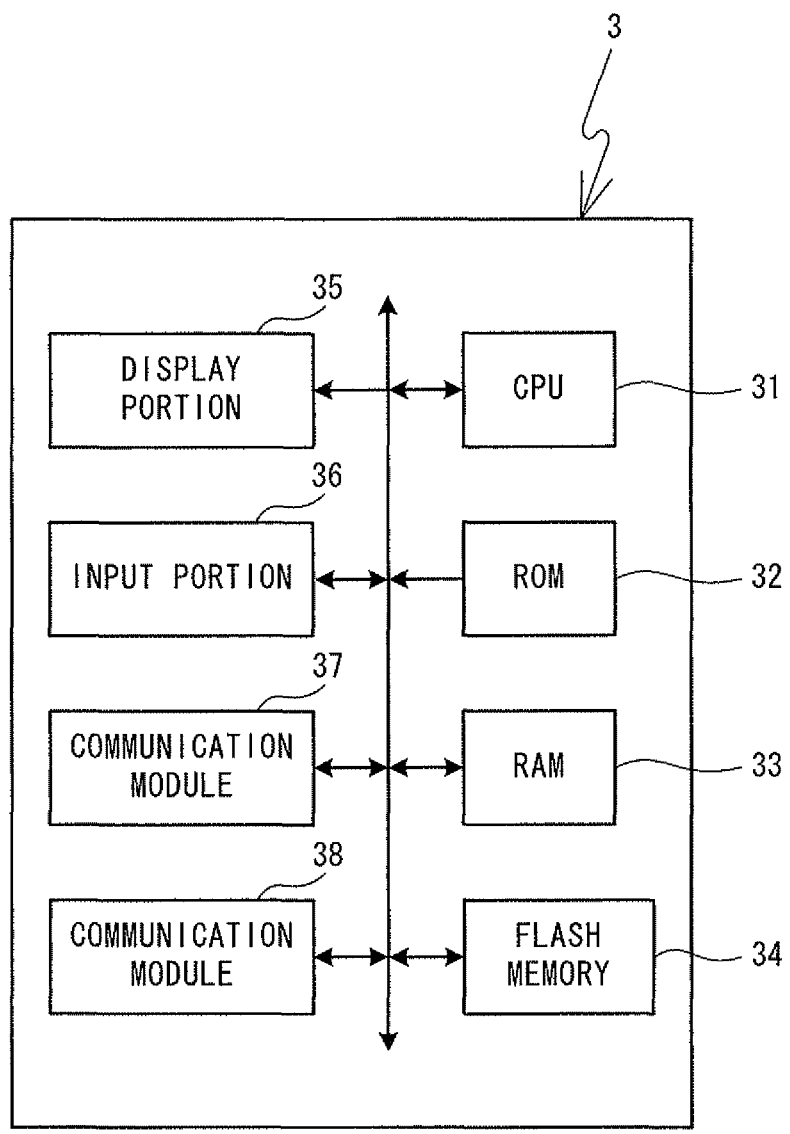
FIG. 4 is a block diagram that shows an electrical configuration of a NAT device 3.

An electrical configuration of the NAT device 3 will be explained with reference to FIG. 4. The electrical configuration of the NAT devices 4 and 5 is the same as that of the NAT device 3. The NAT device 3 includes a CPU 31, a ROM 32, a RAM 33 and a flash memory 34. The CPU 31 controls communication with the communication control device 14, the communication management device 15 and the terminal devices 6 to 9. At least a program executed by the CPU 31 is stored in the ROM 32. At least temporary data generated during processing by the CPU 31 is stored in the RAM 33. A port number is stored in the flash memory 34 as history information. The CPU 31, the ROM 32, the RAM 33 and the flash memory 34 are electrically connected. The CPU 31 can access storage areas of the ROM 32, the RAM 33 and the flash memory 34.

The NAT device 3 is provided with a display portion 35. The display portion 35 can display a status etc. of the NAT device 3. The CPU 31 is electrically connected to the display portion 35. The CPU 31 can cause desired information to be displayed on the display portion 35. An LED can be used as the display portion 35, for example. The NAT device 3 includes an input portion 36. The input portion 36 receives an input operation to the NAT device 3 by a user. The CPU 31 is electrically connected to the input portion 36. The CPU 31 recognizes information input via the input portion 36. A switch or a touch sensor, for example, can be used as the input portion 36.

The NAT device 3 includes a communication module 37. The communication module 37 enables communication via the Internet 10 (via the LAN 12 in the case of the NAT device 5). The CPU 31 is electrically connected to the communication module 37. The CPU 31 can perform communication via the Internet 10 and the LAN 12. The NAT device 3 includes a communication module 38. The communication module 38 enables communication via the LAN 11 and the LAN 12 (via the LAN 13 in the case of the NAT device 5). The CPU 31 is electrically connected to the communication module 38. The CPU 31 can perform communication via the LANs 11 to 13.

Figure 5:
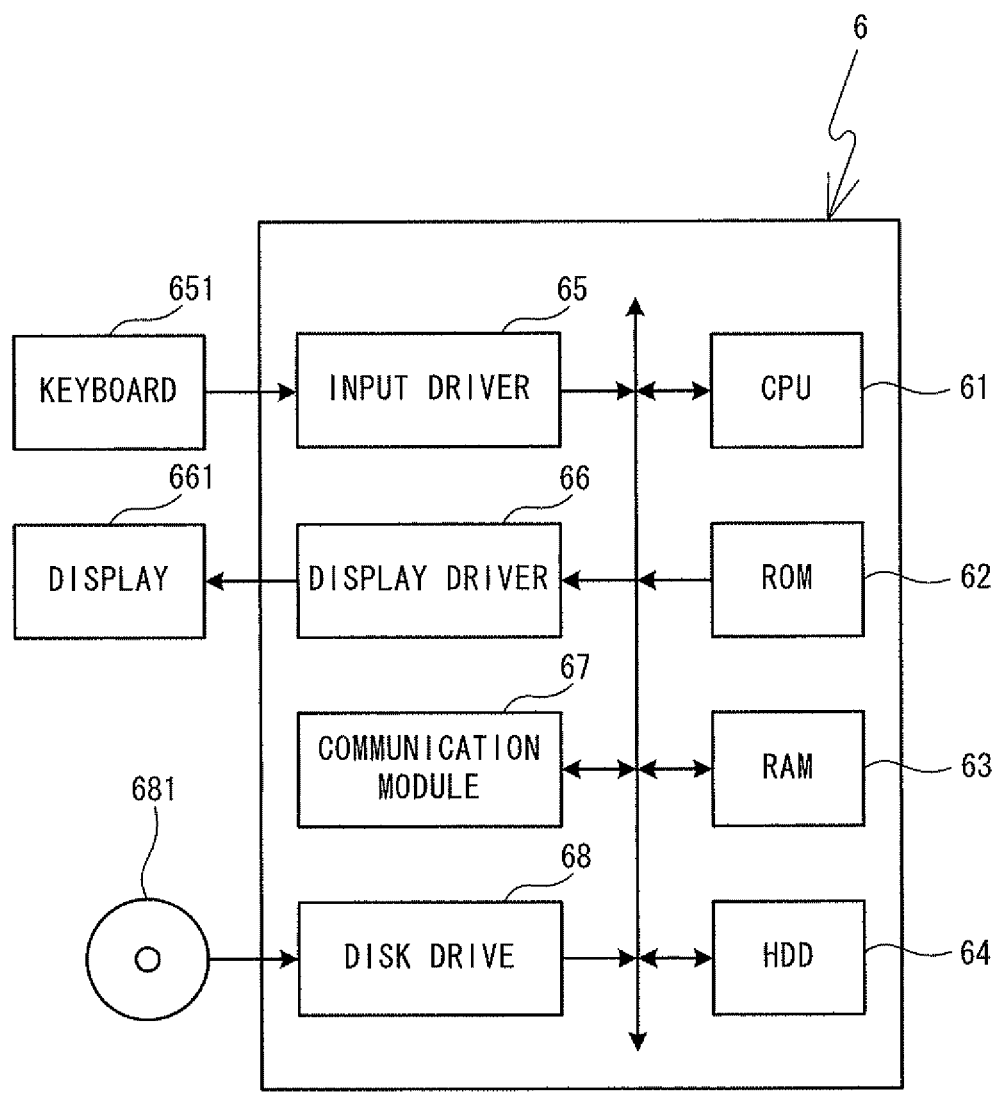
FIG. 5 is a block diagram that shows an electrical configuration of a terminal device 6.

The electrical configuration of the terminal device 6 will be explained with reference to FIG. 5. The electrical configuration of the terminal devices 7 to 9 is the same as that of the terminal device 6. The terminal device 6 is provided with a CPU 61, a ROM 62, a RAM 63 and an HDD 64. The CPU 61 controls communication with the NAT devices 3 to 5, the communication control device 14 and the communication management device 15. At least a boot program and default parameters are stored in the ROM 62. At least temporary data generated during processing by the CPU 61 is stored in the RAM 63. At least a program executed by the CPU 61 is stored in the HDD 64. The CPU 61 is electrically connected to the ROM 62, the RAM 63 and the HDD 64. The CPU 61 can access the storage areas of the ROM 62, the RAM 63 and the HDD 64.

The terminal device 6 is provided with an input driver 65. The input driver 65 detects information that is input via a keyboard 651. The CPU 61 is electrically connected to the input driver 65. The input driver 65 is electrically connected to the keyboard 651. The CPU 61 can recognize the information that is input via the keyboard 651. The terminal device 6 is provided with a display driver 66. The display driver 66 performs control to display images on a display 661. The CPU 61 is electrically connected to the display driver 66. The display driver 66 is electrically connected to the display 661. The CPU 61 can cause a desired image to be displayed on the display 661.

The terminal device 6 is provided with a communication module 67. The communication module 67 enables communication via the LANs 11 to 13. The CPU 61 is electrically connected to the communication module 67. The CPU 61 can perform communication via the LANs 11 to 13. The terminal device 6 is provided with a disk drive 68. The disk drive 68 is a drive device to access information stored in a recording medium 681. The CPU 61 is electrically connected to the disk drive 68. When the recording medium 681 is inserted in the disk drive 68, the CPU 61 can access the information stored in the recording medium 681. The program executed by the CPU 61, for example, is stored in the recording medium 681. When the terminal device 6 connects to the communication system 1, the program is read from the recording medium 681 and stored on the HDD 64.

Communication control processing and update processing will be explained. The communication control processing and the update processing are started and performed by the CPU 21 when a power source of the communication control device 14 is switched on. Note that the communication control processing and the update processing are performed while the OS is sequentially switched at a predetermined interval.

The communication control processing will be explained with reference to FIG. 6 to FIG. 11. Various types of packet transmitted from the terminal devices 6 to 9 (a registration request packet, a type request packet and a multi-stage result packet) are received in the communication control processing. Various types of processing are performed in the communication control device based on the type of the received packet.

Hereinafter, the one of the terminal devices 6 to 9 that transmits a registration request packet, a type request packet and a multi-stage result packet is referred to as a transmission source terminal. When the packet transmitted from the transmission source terminal reaches the communication control device 14 via the NAT devices 3 to 5, the NAT device that directly forwards the packet to the communication control device 14 is hereinafter referred to as a transmission source NAT device. In the example shown in FIG. 1, the NAT device 3 and the NAT device 4 that directly forward the packet to the communication control device 14 correspond to the transmission source NAT device.

A determination is made as to whether or not a registration request packet, which requests registration of the NAT type, has been transmitted from the transmission source terminal (step S11). The registration request packet is transmitted from the transmission source terminal at step S135 (refer to FIG. 17) and step S155 (refer to FIG. 18), which will be explained later. In a case where the registration request packet has been received (yes at step S11), the NAT type included in a data portion of the received packet is registered in the NAT table (registration processing, refer to step S13). After the registration processing is terminated, the processing returns to step S11.

The registration processing will be explained with reference to FIG. 7. In the registration processing, the NAT type included in the data portion of the registration request packet received in the processing at step S11 (refer to FIG. 6) is extracted, and is stored in the NAT table (step S81). A source IP address and a source port number are extracted from a header portion of the registration request packet received at step S11 (refer to FIG. 6). The source IP address corresponds to an IP address on the Internet 10 side of the transmission source NAT device that has forwarded the registration request packet. The source port number corresponds to the port number on the Internet 10 side of the transmission source NAT device that has forwarded the registration request packet. An ID of the transmission source NAT device, an IP address (a terminal IP address) and a port number (a terminal port number) of the terminal device that has transmitted the registration request packet forwarded by the NAT device are extracted from the data portion of the registration request packet. The extracted source IP address, source port number, ID, terminal IP address and terminal port number are respectively stored in the NAT table as the GIP, the GPort, the ID, the LIP and the LPort. As usability information, information is stored in the NAT table indicating that the information in the NAT table can be used.

A given identifier key is generated. The identifier key is a key that can identify the terminal device which is subordinate to the same NAT device. The identifier key is stored in association with the information stored in the NAT table (step S83). A key notification packet is transmitted to the transmission source terminal (step S85). The generated identifier key is stored in a data portion of the key notification packet. The registration processing is terminated and the processing returns to the communication control processing (refer to FIG. 6).

Figure 6:
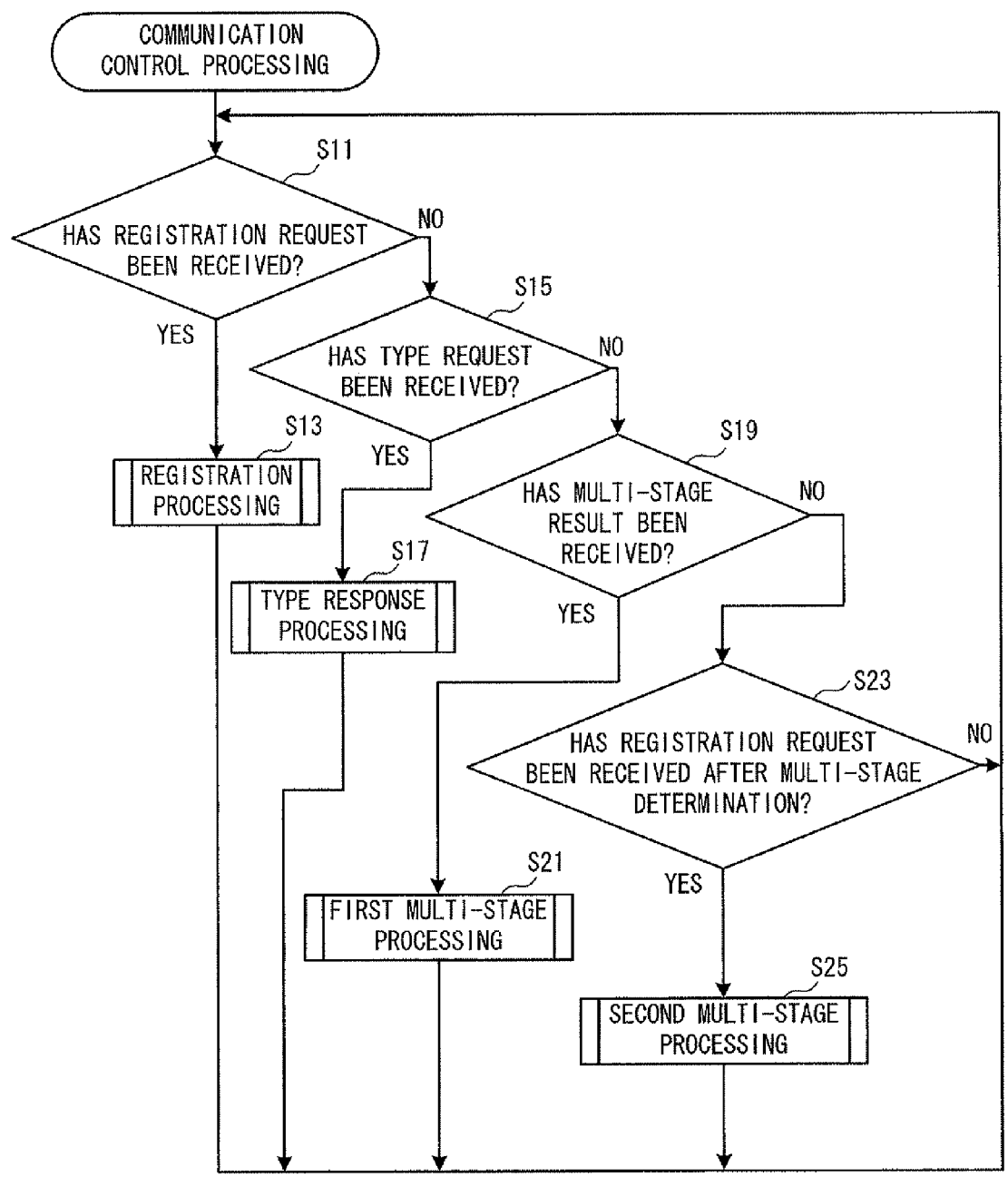
FIG. 6 is a flowchart that shows communication control processing.
Figure 7:
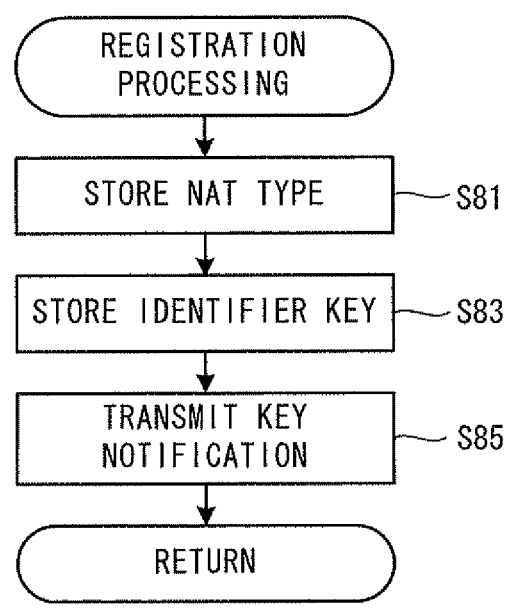
FIG. 7 is a flowchart that shows registration processing.

As shown in FIG. 6, a determination is made as to whether or not a type request packet, which requests transmission of the NAT type, has been received from the transmission source terminal (no at step S11, step S15). The type request packet is transmitted from the transmission source terminal by processing at step S125 (refer to FIG. 17), which will be explained later. In a case where the type request packet has been received (yes at step S15), the NAT type is retrieved from the NAT table stored in the HDD 24 and the NAT type is returned to the transmission source terminal (type response processing, refer to FIG. 8). After the type response processing is terminated, the processing returns to step S11.

Figure 8:
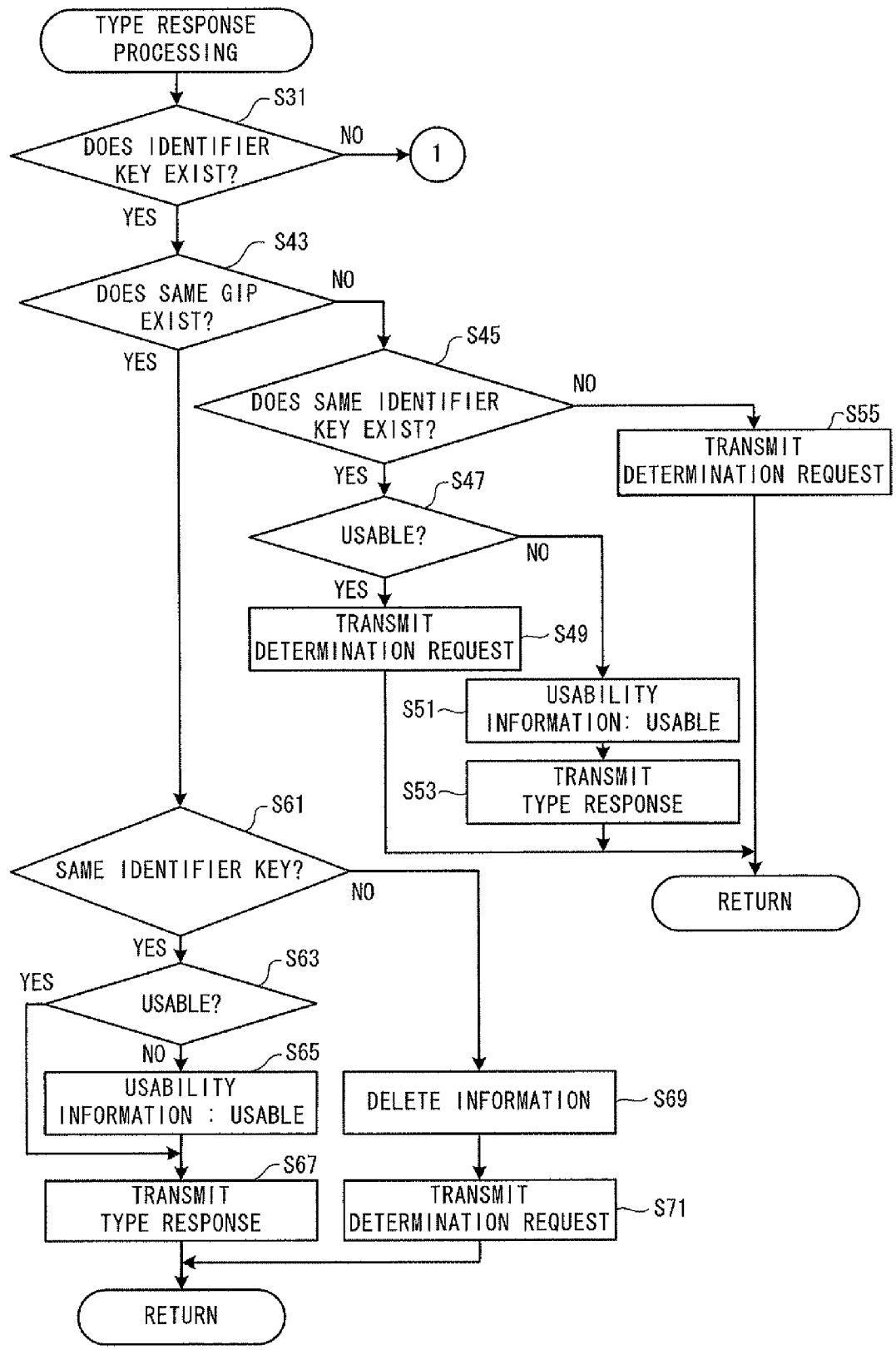
FIG. 8 is a flowchart that shows type response processing.

The type response processing will be explained with reference to FIG. 8 and FIG. 9. A determination is made as to whether or not an identifier key is included in a data portion of the type request packet (step S31). The identifier key is notified from the communication control device 14 to the terminal devices 6 to 9 at step S85 (refer to FIG. 7), in response to the registration request packet transmitted by the terminal devices 6 to 9. In a case where the identifier key has been notified from the communication control device 14, the terminal devices 6 to 9 transmit the type request packet to the communication control device 14 at step S125 (refer to FIG. 17), the type request packet including the identifier key. By determining whether or not the identifier key is included in the type request packet, the communication control device 14 can determine whether or not it has previously received a type request packet via the same NAT device.

In a case where the identifier key is included in the type request packet (yes at step S31), a source IP address that is included in a header of the type request packet is extracted. The source IP address corresponds to the GIP of the transmission source NAT device that has transmitted the type request packet. A determination is made as to whether or not the GIP of the transmission source NAT device is stored in the NAT table as the GIP (step S43). In a case where the GIP of the transmission source NAT device (hereinafter referred to as "matching GIP") is stored in the NAT table as the GIP (yes at step S43), the type request packet has been previously received via the transmission source NAT device. The processing advances to step S61.

A determination is made as to whether or not an identifier key associated with the matching GIP determined at step S43 is the same as the identifier key stored in the data portion of the received type request packet (step S61). In a case where the identifier key associated with the determined matching GIP is the same as the identifier key stored in the data portion of the type request packet (hereinafter referred to as "matching identifier key") (yes at step S61), a determination is made as to whether or not usability information that is associated with the determined matching GIP and matching identifier key indicates "usable" (step S63). In a case where the usability information that is associated with the determined matching GIP and matching identifier key indicates "not usable" (no at step S63), information indicating "usable" is stored in the NAT table as the usability information (step S65). The processing advances to step S67. In a case where the usability information that is associated with the determined matching GIP and matching identifier key indicates "usable" (yes at step S63), the processing advances as it is to step S67.

A type response packet, which includes the NAT type associated with the determined matching GIP and matching identifier key, is transmitted to the transmission source terminal (step S67). The type response processing is terminated, and the processing returns to the communication control processing (refer to FIG. 6).

As described above, the communication control device 14 determines whether or not the source IP address included in the header portion of the received type request packet and the identifier key included in the data portion of the received type request packet match the GIP and the identifier key of the NAT table. In a case where the GIP and the identifier key match, the NAT type is notified to the transmission source terminal. Based on the notified NAT type, the transmission source terminal can perform P2P communication with another of the terminal devices.

In a case where the identifier key included in the data portion of the type request packet received at step S15 (refer to FIG. 6) is different to the target identifier key among the identifier keys in the NAT table (no at step S61), it is possible that the GIP of the transmission source NAT device has been set on one of the NAT devices that is different to the transmission source NAT device. Among the information stored in the NAT table, information associated with the target identifier key is deleted (step S69). In this way, information that has become old is deleted from the NAT table.

A determination request packet, which requests determination of the NAT type, is transmitted to the transmission source terminal (step S71). In response to the determination request packet, the transmission source terminal returns, at step S135 (refer to FIG. 17), a registration request packet, which includes the NAT type in a data portion. The communication control device 14 receives the registration request packet (step S11, refer to FIG. 6) and registers the NAT type (step S81, refer to FIG. 7). In this way, a latest NAT type is registered in the NAT table. The type response processing is terminated and the processing returns to the communication control processing (refer to FIG. 6).

In a case where the identifier key is included in the data portion of the type request packet received at step S15 (refer to FIG. 6) (yes at step S31), but the GIP of the transmission source NAT device is not stored in the NAT table as the GIP (no at step S43), there is a possibility that settings of the GIP of the transmission source NAT device have been changed. A determination is made as to whether or not the identifier key stored in the data portion of the type request packet received at step S15 (refer to FIG. 6) is stored in the NAT table (step S45). In a case where the identifier key stored in the data portion of the type request packet is not stored in the NAT table (no at step S45), it is not possible to retrieve the NAT type from the NAT table. In order to newly register the NAT type, a determination request packet is transmitted to the transmission source terminal (step S55). The processing returns to the communication control processing (refer to FIG. 6).

In a case where the identifier key that is included in the data portion of the type request packet is stored in the NAT table (yes at step S45), the NAT type can be identified based on the NAT table, by referring to the identifier key. In the NAT table, usability information is referred to that is associated with the identifier key stored in the data portion of the type request packet (step S47). In a case where the usability information of the NAT table indicates "usable" (yes at step S47), this indicates that the GIP of the transmission source NAT device has been changed, regardless of the fact that the NAT type is in a usable state. In order to acquire the latest NAT type from the transmission source terminal and register the latest NAT type in the NAT table, a determination request packet is transmitted to the transmission source terminal (step S49). The processing returns to the communication control processing (refer to FIG. 6).

In a case where the usability information in the NAT table indicates "not usable" (no at step S47), the source IP address included in the header portion of the type request packet received at step S15 (refer to FIG. 6) is associated with the identifier key in the NAT table that is the same as the identifier key stored in the data portion of the type request packet and is stored as the GIP. Information that includes to be usable is stored as the usability information in the NAT table (step S51). A type response packet is transmitted to the transmission source terminal (step S53). The type response packet includes, in a data portion, the NAT type associated with the identifier key of the NAT table that is the same as the identifier key stored in the data portion of the received type request packet. The processing returns to the communication control processing (refer to FIG. 6).

In the present disclosure, as described above, in a case where the identifier key stored in the data portion of the received type request packet matches the identifier key of the NAT table, the communication control device 14 can notify the NAT type to the transmission source terminal. In this way, even when the IP address of the NAT device has been changed, the terminal device can immediately acquire the NAT type from the communication control device 14 and start P2P communication with another one of the terminal devices.

In a case where the identifier key is not included in the data portion of the type request packet received in the processing at step S15 (refer to FIG. 6) (no at step S31), this indicates that a registration request packet has not previously been received from the transmission source terminal. As shown in FIG. 9, a determination is made as to whether or not the GIP that matches the source IP address included in the header portion of the received type request packet exists in the NAT table (step S33). The source IP address included in the header portion of the type request packet corresponds to the GIP of the transmission source NAT device. In a case where the GIP of the transmission source NAT device does not exist in the NAT table (no at step S33), the communication control device 14 cannot retrieve the NAT type from the NAT table. In order to newly register the NAT type, a determination request packet is transmitted to the transmission source terminal (step S41). The type response processing is terminated and the processing returns to the communication control processing (refer to FIG. 6).

In a case where the GIP of the transmission source NAT device exists in the NAT table (yes at step S33), it is possible that the NAT device other than the transmission source NAT device is located between the communication control device 14 and the transmission source terminal. Hereinafter, a state in which the NAT device other than the transmission source NAT device is located between the communication control device 14 and the terminal device is referred to as a "multi-stage state." A situation will be explained, with reference to FIG. 13, in which a type request packet is forwarded in the multi-stage state. The terminal device 8 has already transmitted a registration request packet to the communication control device 14 and the terminal device 8 has acquired an identifier key. The terminal device 9 has not transmitted a registration request packet to the communication control device 14 and the terminal device 9 has not acquired an identifier key.

A type request packet is transmitted from the terminal device 8 to the communication control device 14 (41). The data portion of the transmitted type request packet includes an identifier key. "G8" in FIG. 13 indicates a source IP address stored in a header portion of the type request packet. "XXX" indicates that the identifier key is included in a data portion of the type request packet. The source IP address stored in the header portion of the transmitted type request packet is converted by the NAT device 4 (G8→G4). The type request packet with the converted source IP address is forwarded by the NAT device 4 (42). The communication control device 14 receives the type request packet that is forwarded via the NAT device 4 (46).

A type request packet is transmitted from the terminal device 9 to the communication control device 14 (43). The identifier key is not included in the data portion of the transmitted type request packet. A source IP address stored in a header portion of the transmitted type request packet is converted by the NAT device 5 (G9→G5) and is forwarded (44). The source IP address is further converted by the NAT device 4 (G5→G4) and is forwarded (45). The communication control device 14 receives the type request packet that is forwarded via the NAT device 4 (46).

The communication control device 14 has already received the registration request packet from the terminal device 8 and thus information is registered in the NAT table (refer to FIG. 3, for example). In a case where the communication control device 14 has received the type request packet from the terminal device 9, the identifier key is not included in the data portion of the type request packet (no at step S31 in FIG. 7), but the same GIP (G4) as the source IP address stored in the header portion of the type request packet is stored in the NAT table (yes at step S33 (refer to FIG. 7)). In this type of case, the CPU 21 determines that the terminal device 9 is connected to the NAT device 4 via the NAT device 5 and there is a possibility of a multi-stage state.

Figure 9:
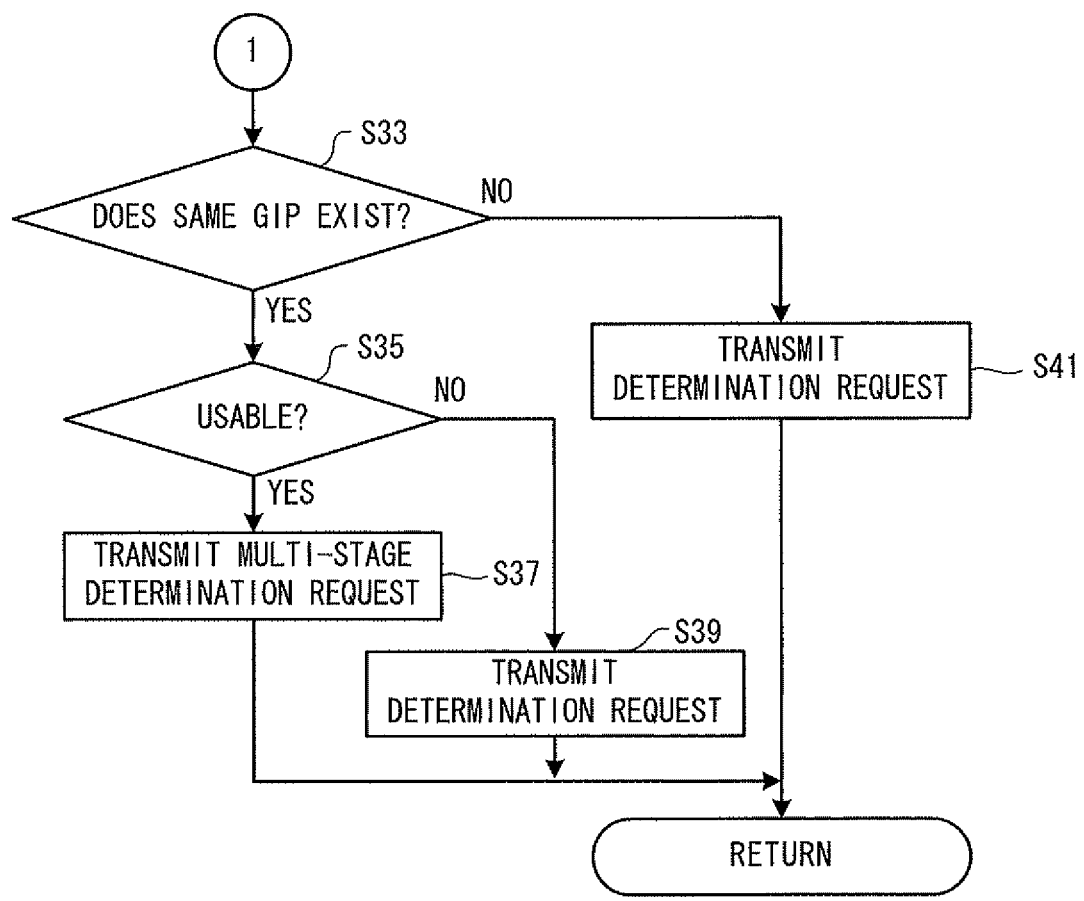
FIG. 9 is a flowchart that shows the type response processing, continued from FIG. 8.

As shown in FIG. 9, in a case where the GIP that matches the GIP of the transmission source NAT device exists in the NAT table (yes at step S33), it is determined that there is a possibility that the terminal device is in the multi-stage state. Usability information that is associated with the GIP that is the same as the source IP address stored in the header portion of the received type request packet is referred to in the NAT table (step S35). In a case where the usability information indicates "usable" (yes at step S35), a multi-stage determination request packet is transmitted to the transmission source terminal. The multi-stage determination request packet requests communication with the other terminal device (hereinafter sometimes referred to as "partner terminal") that is subordinate to the transmission source NAT device. At the same time, a multi-stage determination request packet that requests communication with the transmission source terminal is transmitted to the partner terminal (step S37). In the example shown in FIG. 13, for example, multi-stage determination request packets are transmitted to both the terminal device 8 and the terminal device 9 that are subordinate to the NAT device 4. The type response processing is terminated and the processing returns to the communication control processing (refer to FIG. 6). Based on information included in a response packet (a multi-stage result packet) corresponding to the multi-stage determination request packet transmitted at step S37, at step S21 (refer to FIG. 6), the CPU 21 determines whether or not the transmission source terminal is in the multi-stage state.

In a case where the usability information indicates "not usable" (no at step S35), in order to acquire the latest NAT type from the transmission source terminal and register the latest NAT type in the NAT table, a determination request packet is transmitted to the transmission source terminal (step S39). The processing returns to the communication control processing (refer to FIG. 6).

As shown in FIG. 6, a determination is made as to whether or not a multi-stage result packet has been received from the transmission source terminal and the partner terminal (no at step S15, step S19). In the transmission source terminal and the partner terminal, the multi-stage result packets are transmitted to the communication control device 14 at step S177 (refer to FIG. 19) and at step S189 (refer to FIG. 20). In a case where the multi-stage result packets transmitted from the transmission source terminal and the partner terminal have been received (yes at step S19), based on information included in data portions of the multi-stage result packets, processing (first multi-stage processing) is performed to return information to the transmission source terminal (step S21).

The first multi-stage processing will be explained with reference to FIG. 10. The information included in the received multi-stage result packets is referred to by the processing at step S19 (refer to FIG. 6). The data portions of the multi-stage result packets include result information (hereinafter referred to as "communication result information") of communication performed between the terminal devices that have received the multi-stage determination request packets (refer to FIG. 19 and FIG. 20). The communication result information included in the data portions of the received multi-stage result packets is stored in the RAM 33. By comprehensively analyzing the communication result information, it is analyzed whether or not the transmission source terminal and the partner terminal are in the multi-stage state (step S91). Analysis is performed as described below, for example.

Figure 14:
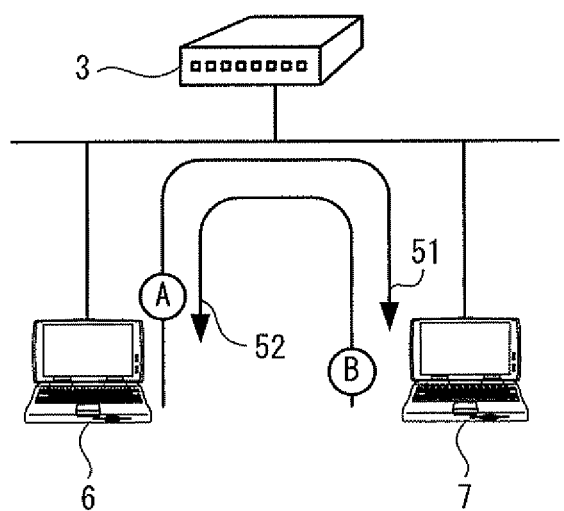
FIG. 14 is a diagram that shows communication of the terminal devices that are not in the multi-stage state.

As shown in FIG. 14, it is assumed that communication is performed between the terminal device 6 and the terminal device 7 that are subordinate to the NAT device 3. In this case, the NAT device is not located between the terminal device 6 and the terminal device 7. As a result, when a packet A is transmitted from the terminal device 6 to the terminal device 7, the packet A reaches the terminal device 7 (51). Similarly, when a packet B is transmitted from the terminal device 7 to the terminal device 6, the packet B reaches the terminal device 6 (52). The terminal device 6 includes, in a data portion of a multi-stage result packet, as the communication result information, information indicating that it has received the packet B, and transmits the multi-stage result packet to the communication control device 14. The terminal device 7 includes, in a data portion of a multi-stage result packet, as the communication result information, information indicating that it has received the packet A, and transmits the multi-stage result packet to the communication control device 14. By analyzing the communication result information received from the terminal device 6 and the terminal device 7, the communication control device 14 can recognize that the terminal device 6 and the terminal device 7 are not in the multi-stage state.

Figure 15:
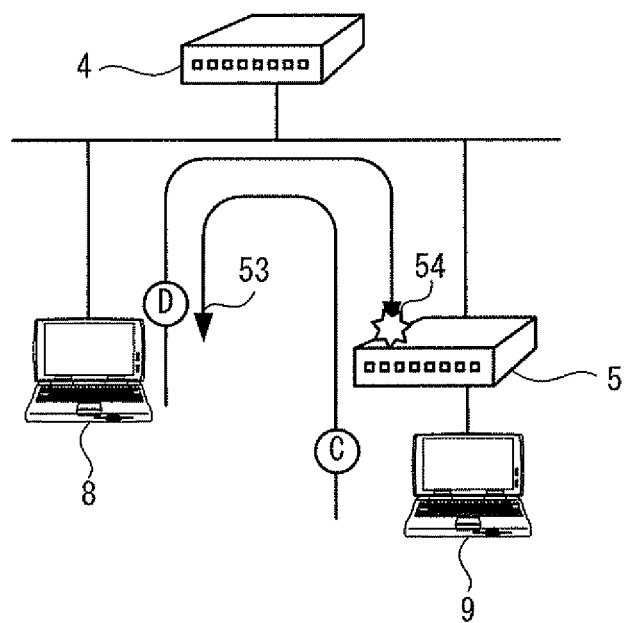
FIG. 15 is a diagram that shows communication between the terminal devices that are in the multi-stage state.

As shown in FIG. 15, it is assumed that communication is performed between the terminal device 8 and the terminal device 9 that are subordinate to the NAT device 4. In this case, the NAT device 5 is located between the terminal device 8 and the terminal device 9. As a result, when a packet C is transmitted from the terminal device 9 to the terminal device 8, the packet C reaches the terminal device 8 (53). When a packet D is transmitted from the terminal device 8 to the terminal device 9, the packet D is blocked by the NAT device 5 and does not reach the terminal device 9 (54). The terminal device 8 includes information indicating that it has received the packet C, and transmits the multi-stage result packet to the communication control device 14. The terminal device 9 includes information indicating that it was not able to receive the packet D, and transmits the multi-stage result packet to the communication control device 14. By analyzing these pieces of information, the communication control device 14 can recognize that the terminal device 8 is not in the multi-stage state and that the terminal device 9 is in the multi-stage state.

Figure 16:
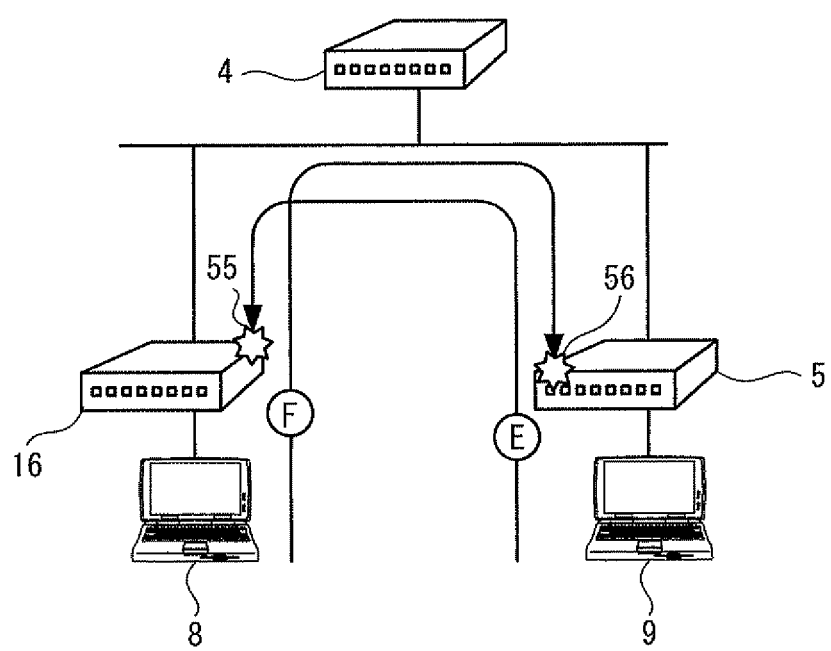
FIG. 16 is a diagram that shows communication between the terminal devices that are in the multi-stage state.

As shown in FIG. 16, it is assumed that communication is performed between the terminal device 8 and the terminal device 9 in a state in which a NAT device 16 is located between the NAT device 4 and the terminal device 8, and the NAT device 5 is located between the NAT device 4 and the terminal device 9. When a packet E is transmitted from the terminal device 9 to the terminal device 8, the packet E does not reach the terminal device 8 (55). When a packet F is transmitted from the terminal device 8 to the terminal device 9, the packet F does not reach the terminal device 9 (56). The terminal device 8 includes information indicating that it was not able to receive the packet E, and transmits the multi-stage result packet to the communication control device 14. The terminal device 9 includes information indicating that it was not able to receive the packet F, and transmits the multi-stage result packet to the communication control device 14. By analyzing these pieces of information, the communication control device 14 can recognize that both the terminal device 8 and the terminal device 9 are in the multi-stage state.

Figure 10:
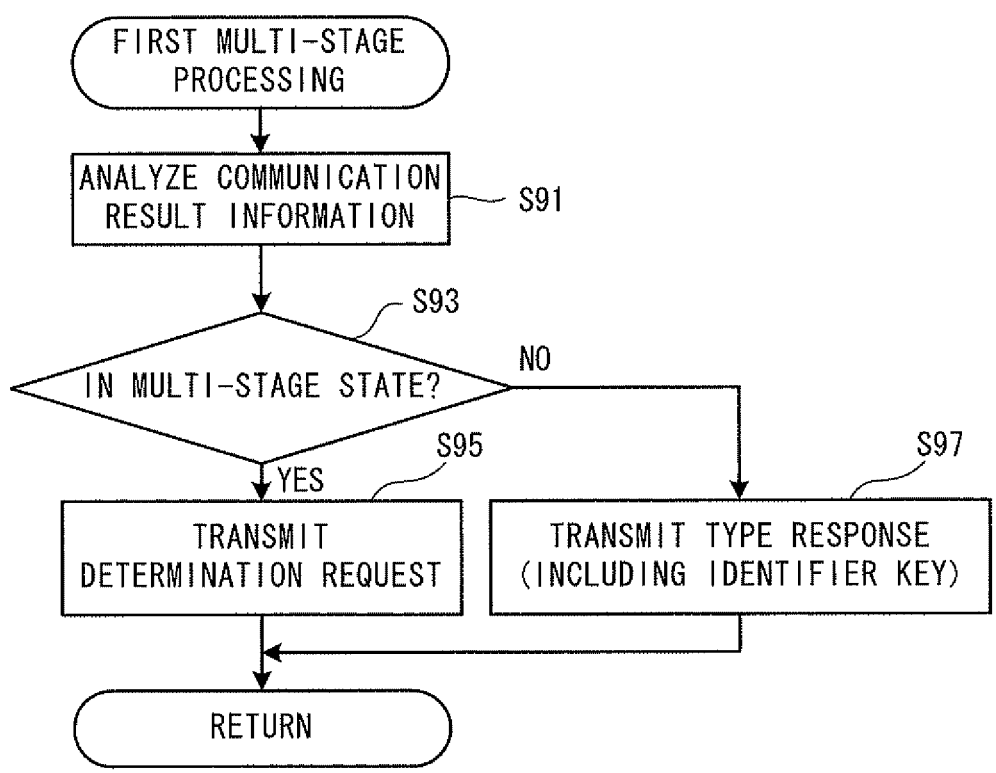
FIG. 10 is a flowchart that shows first multi-stage processing.

As shown in FIG. 10, in a case where, as a result of analysis (refer to step S91), it is determined that the transmission source terminal and the partner terminal are not in the multi-stage state (no at step S93), the IP address that is stored in the header portion of the multi-stage result packet is extracted. The extracted IP address corresponds to the GIP of the transmission source NAT device. The identifier key and the NAT type that are associated with the extracted GIP are selected from the NAT table. A type response packet that includes the selected identifier key and NAT type in a data portion is transmitted to the transmission source terminal (step S97). The type response processing is terminated and the processing returns to the communication control processing (refer to FIG. 6).

In a case where, as a result of analysis (refer to step S91), it is determined that at least one of the transmission source terminal and the partner terminal is in the multi-stage state (yes at step S93), there is a possibility that there is a difference between the NAT type stored in the NAF table and the NAT type determined on the terminal device. This is because the terminal device determines, for the NAT device located on a path between the terminal device itself and the communication control device 14, the NAT type (among the NAT types) with the most stringent forwarding restrictions, and transmits the NAT type to the communication control device 14 (this will be explained in more detail later). In this case, in order to accurately recognize the NAT type in the multi-stage state, a determination request packet is transmitted to the side of the terminal device that has been determined to be in the multi-stage state (step S95). The first multi-stage processing is terminated and the processing returns to the communication control processing (refer to FIG. 6). In processing at step S155 (refer to FIG. 18), the terminal device that has received the determination request packet transmits a registration request packet. The registration request packet that is transmitted from the terminal device is processed in second multi-stage processing (refer to FIG. 11).

Figure 13:
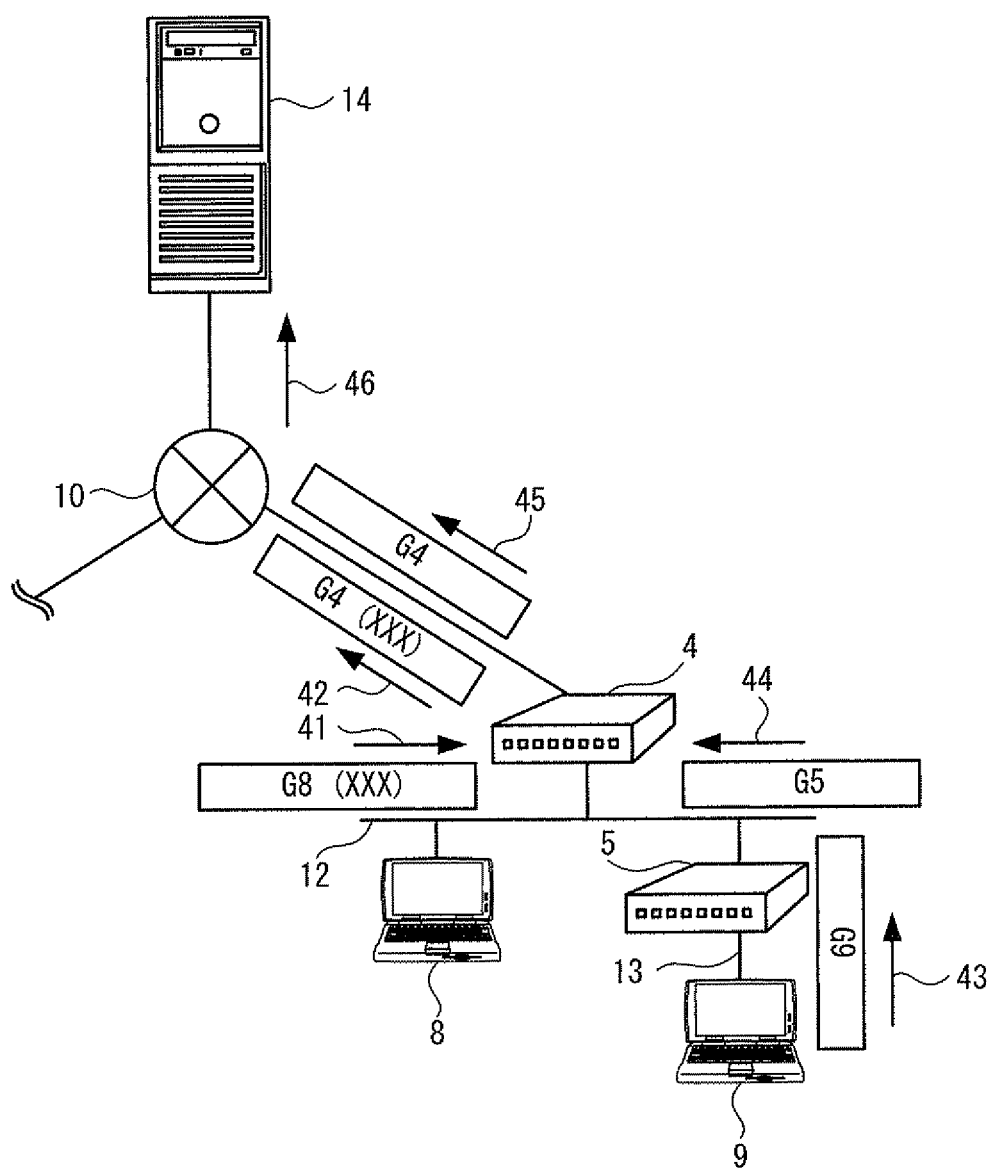
FIG. 13 is a diagram that shows communication of the terminal devices that are in a multi-stage state.

In FIG. 13, for example, a case is assumed in which the NAT type of the NAT device 4 is Full Cone NAT, and the NAT type of the NAT device 5 is Symmetric NAT. The result of the NAT type determined on the terminal device 8 is Full Cone NAT, and so Full Cone NAT is registered in the NAT table. The NAT type that is determined on the terminal device 9 (which is in the multi-stage state) is Symmetric NAT, which has more stringent forwarding restrictions than Full Cone NAT. In the present disclosure, by registering the NAT type determined on the terminal device 9 to the NAT table, the terminal device in the multi-stage state can accurately recognize the NAT type.

Figure 17:
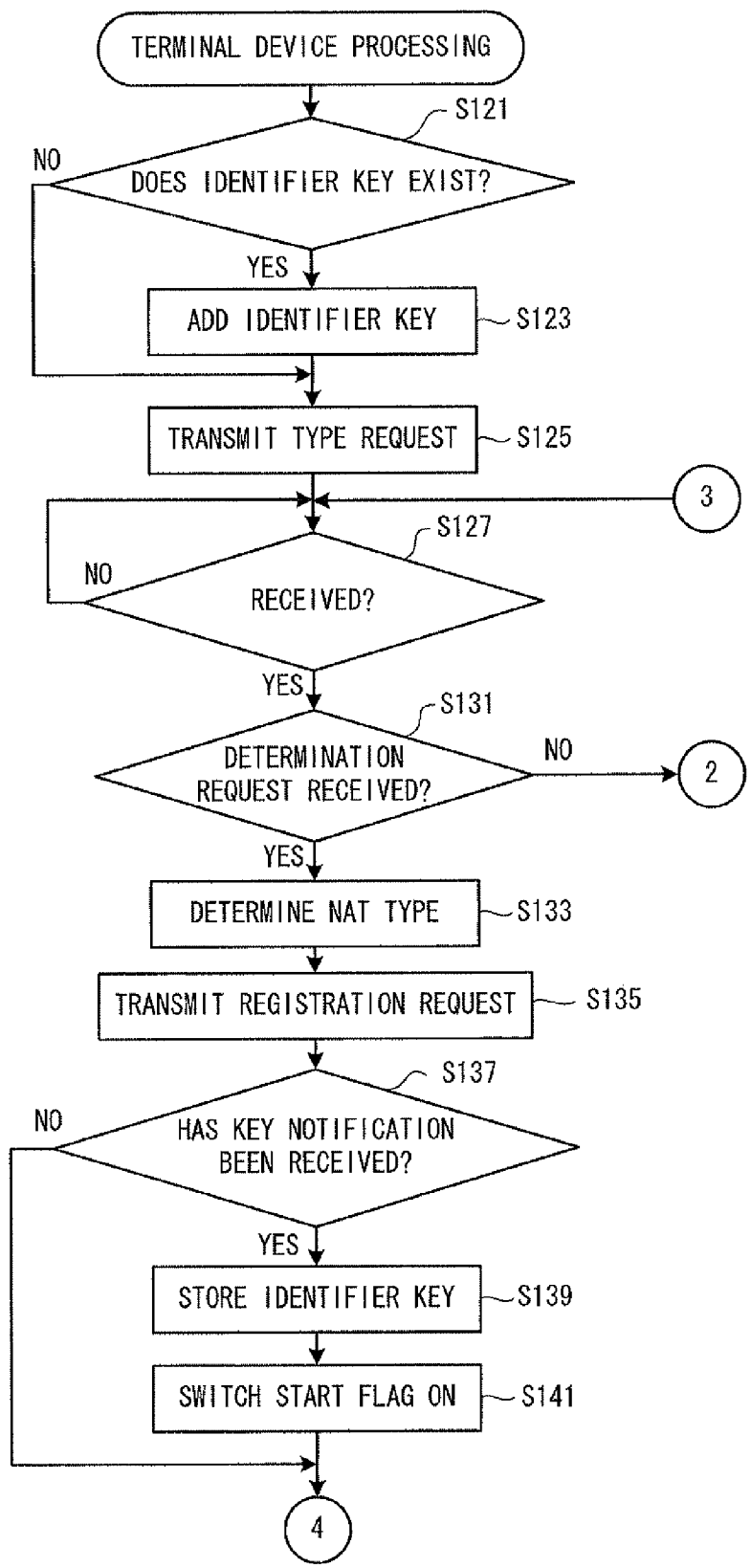
FIG. 17 is a flowchart that shows terminal device processing.

As shown in FIG. 6, after the multi-stage state determination by the processing at step S21, a determination is made as to whether or not the registration request packet from the transmission source terminal has been received (no at step S19, step S23). The registration request packet is transmitted from the terminal device that is in the multi-stage state at step S155 (FIG. 18) and at step S135 (FIG. 17). The NAT type determined on the transmission source terminal is included in a data portion of the registration request packet. In a case where the registration request packet transmitted from the terminal device that is in the multi-stage state has been received (yes at step S23), the NAT type included in the data portion of the registration request packet is stored in the NAT table (second multi-stage processing, step S25).

Figure 11:
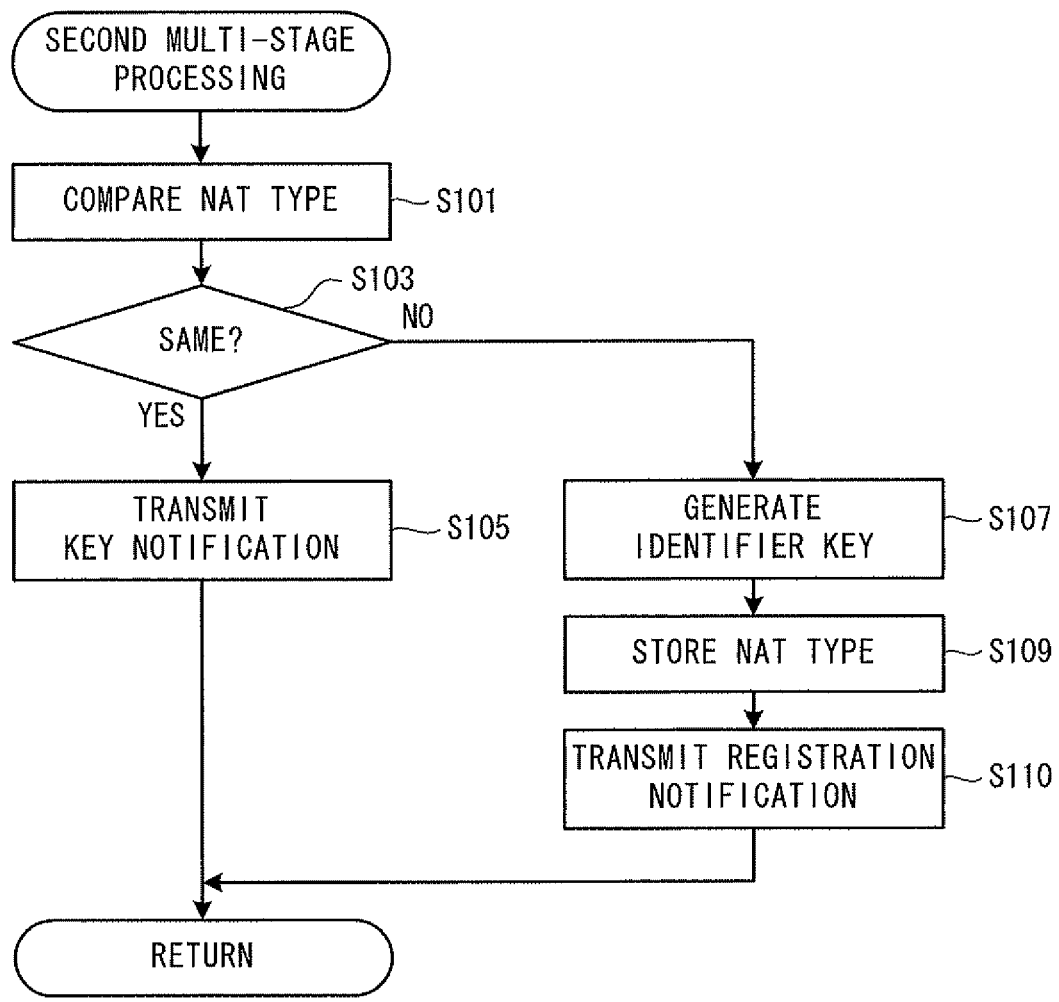
FIG. 11 is a flowchart that shows second multi-stage processing.

The second multi-stage processing will be explained with reference to FIG. 11. A source IP address that is stored in a header portion of the registration request packet received at step S23 (refer to FIG. 6) is extracted. The extracted source IP address corresponds to the GIP of the transmission source NAT device. Of the NAT types that are stored in the NAT table, the NAT type that is associated with the extracted GIP is selected. The selected NAT type is registered by the other terminal device, which is subordinate to the transmission source NAT device and is different to the terminal device that transmitted the registration request packet.

The selected NAT type is compared with the NAT type included in the data portion of the received registration request packet (step S101). In a case where the NAT types are the same (yes at step S103), a key notification packet is created, the key notification packet including the identifier key that is associated with the GIP in the NAT table that is the same as the GIP of the transmission source NAT device. The created key notification packet is transmitted to the transmission source terminal (step S105). The second multi-stage processing is terminated and the processing returns to the communication control processing (refer to FIG. 6).

In a case where the selected NAT type and the NAT type included in the data portion of the received registration request packet are different (no at step S103), an identifier key is newly generated (step S107). The NAT type included in the data portion of the registration request packet is associated with the generated identifier key and registered in the NAT table (step S109). The source IP address and a source port number are extracted from the header portion of the registration request packet received at step S23 (refer to FIG. 6). The extracted source IP address corresponds to the IP address on the Internet 10 side of the transmission source NAT device that has forwarded the registration request packet. The extracted source port number corresponds to the port number on the Internet 10 side of the transmission source NAT device that has forwarded the registration request packet. The ID of the transmission source NAT device, the terminal IP address and the terminal port number of the terminal device that has transmitted the registration request packet forwarded by the NAT device are extracted from the data portion of the registration request packet received at step S23 (refer to FIG. 6). The extracted source IP address, source port number, ID, terminal IP address and terminal port number are stored in the NAT table as the ID, the GIP, the GPort, the LIP and the LPort, respectively. As usability information, information indicating "usable" is stored in the NAT table. A registration notification packet, which notifies that the registration is complete, is transmitted to the transmission source terminal (step S110). The generated identifier key is stored in a data portion of the registration notification packet. The second multi-stage processing is terminated and the processing returns to the communication control processing (refer to FIG. 6).

As described above, in the present disclosure, the communication control device 14 can accurately ascertain the NAT type even in the multi-stage state, and can register the NAT type in the NAT table. By acquiring the NAT type from the communication control device 14, the terminal device that is in the multi-stage state can accurately determine a method to establish communication corresponding to the NAT type. The terminal device can perform communication by the determined method to establish communication. The terminal device that is in the multi-stage state can reliably perform P2P communication with another of the terminal devices.

Update processing will be explained. The communication control device 14 updates the usability information of the NAT table depending on whether the terminal device is performing a predetermined communication (teleconferencing etc.). A communication status of each of the terminal devices is stored in the communication management device 15. The communication control device 14 performs communication with the communication management device 15 through the update processing, and acquires information of the communication status of each of the terminal devices from the communication management device 15.

Figure 12:
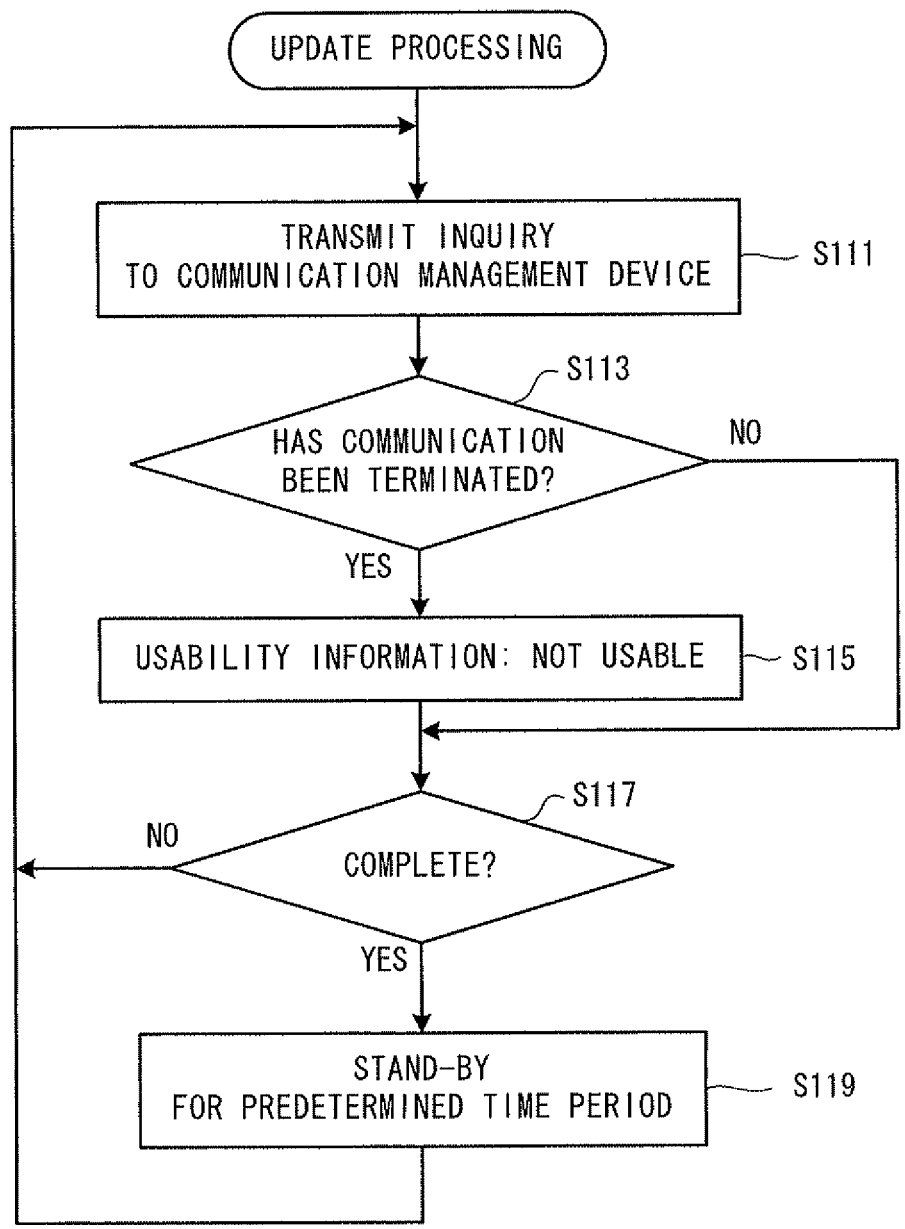
FIG. 12 is a flowchart that shows update processing.

The update processing will be explained with reference to FIG. 12. An inquiry packet is transmitted to the communication management device 15 (step S111). The inquiry packet inquires whether the terminal device that is subordinate to the NAT device registered in the NAT table is performing the predetermined communication. The communication management device 15 receives the inquiry packet. From among the stored communication status of each of the terminal devices, the communication management device 15 assesses the communication status of the terminal device that is the target of the inquiry. A response packet is returned from the communication management device 15 to the communication control device 14. The response packet includes information indicating whether or not the terminal device is performing the predetermined communication. The communication control device 14 receives the response packet transmitted from the communication management device 15. By referring to the information included in the received response packet, the communication control device 14 determines whether the terminal device is performing the predetermined communication.

In a case where it is determined that the terminal device has terminated the predetermined communication (yes at step S113), on the NAT table, information indicating "not usable" is stored in the usability information which is associated with the ID of the NAT device to which the terminal device is subordinate (step S115). The processing advances to step S117. In a case where it is determined that the terminal device is continuing to perform the predetermined communication (no at step S113), the processing advances to step S117.

At step S117, a determination is made as to whether or not the communication status of the terminal devices subordinate to all of the NAT devices registered in the NAT table has been confirmed (step S117). In a case where the terminal device remains for which the communication status has not been confirmed (no at step S117), the processing returns to step S11.1. In a case where the communication status of the terminal devices that are subordinate to all the NAT devices registered in the NAT table has been confirmed (yes at step S117), the processing is on stand-by until a predetermined time period elapses (step S119). After the predetermined time period has elapsed, the processing returns to step S111.

As described above, in the present disclosure, in a case where the predetermined communication is terminated on the terminal device, the information indicating "not usable" is stored in the usability information. In a case where the predetermined communication is terminated on the terminal device, there is a high possibility that settings of the NAT device will be changed. In this type of case, by making the NAT table not usable, the communication control device 14 can prevent an erroneous NAT type being notified to the terminal device.

Terminal device processing and normal determination processing will be explained with reference to FIG. 17 to FIG. 20. When the power source of the terminal devices 6 to 9 is switched on, the terminal device processing and the normal determination processing is started and performed by the CPU 61. The terminal device processing and the normal determination processing are performed while the OS is sequentially switched at a predetermined interval.

The terminal device processing will be explained with reference to FIG. 17. A determination is made as to whether or not an identifier key is stored in the RAM 63 (step S121). The identifier key is stored in the RAM 63 when a key notification packet or a type response packet is received from the communication control device 14 (step S139 and step S159 (refer to FIG. 18)). The key notification packet is transmitted from the communication control device 14 at step S105 (refer to FIG. 11). The type response packet is transmitted from the communication control device 14 at step S53 (refer to FIG. 8), at step S67 (refer to FIG. 8) and at step S97 (refer to FIG. 10). In a case where the identifier key is stored in the RAM 63 (yes at step S121), the identifier key stored in the RAM 63 is added to a data portion of a type request packet (step S123). The type request packet that includes the identifier key in the data portion is transmitted to the communication control device 14 (step S125). The processing then advances to step S127. In a case where the identifier key is not stored in the RAM 63 (no at step S121), a type request packet that does not include the identifier key in a data portion is transmitted to the communication control device 14 (step S125). The processing then advances to step S127.

Monitoring is performed to monitor reception of a packet returned from the communication control device 14 in response to the type request packet transmitted in the processing at step S125 (step S127). The received packet is one of a determination request packet, a type response packet and a multi-stage determination request packet. The determination request packet is transmitted from the communication control device 14 at step S49 (refer to FIG. 8), at step S55 (refer to FIG. 8), at step S71 (refer to FIG. 8), at step S39 (refer to FIG. 9), at step S41 (refer to FIG. 9 and at step S95 (refer to FIG. 10). The type response packet is transmitted from the communication control device 14 at step S53 (refer to FIG. 8), at step S67 (refer to FIG. 8) and at step S97 (refer to FIG. 10).

The multi-stage determination request packet is transmitted from the communication control device 14 at step S37 (refer to FIG. 9). In a case where none of the packets is received (no at step S127), the processing returns to step S127 and continues to monitor reception of packets.

In a case where one of the packets has been received (yes at step S127), processing is performed depending on a type of the received packet. A determination is made as to whether or not the received packet is the determination request packet (step S131). In a case where the determination request packet has been received (yes at step S131), the NAT type is determined (step S133). CPU 61 determines the NAT type by performing transmission and reception of packets with the communication control device 14. Of the NAT types of the NAT device that is located on the path between the terminal device and the communication control device 14, the NAT type with the most stringent forwarding restrictions is determined. The NAT device for which the NAT type is Full Cone NAT forwards packets from the Internet side to the LAN side without relying on the source IP address and the source port number of the packet. The NAT device for which the NAT type is Address-Restricted Cone NAT only forwards, from the Internet side to the LAN side, a packet on which is set, as the source IP address, the same IP address as the source IP address of a packet that has been forwarded from the LAN side to the Internet side. The NAT device for which the NAT type is Port-Restricted Cone NAT only forwards, from the Internet side to the LAN side, a packet on which is set, as the source IP address and the source port number, the same IP address and the same port number as the source IP address and the source port number of a packet that has been forwarded from the LAN side to the Internet side. In a case of the NAT device for which the NAT type is Symmetric NAT, in addition to the restrictions of the NAT device for which the NAT type is Port-Restricted Cone NAT, the LAN side port number and the Internet side port number with respect to the NAT device are associated with each other one-to-one. For that reason, in the case of the NAT device for which the NAT type is Symmetric NAT, when a packet transmitted from the terminal device on the LAN side is received by the terminal device on the Internet side via the NAT device, only the packet transmitted from that terminal device on the Internet side is forwarded to the LAN side. Thus, the forwarding restrictions become more stringent in the following order: Full Cone NAT, Address-Restricted Cone NAT, Port-Restricted Cone NAT and then Symmetric NAT. In addition, on the NAT device, forwarding restrictions are changed depending on a regularity of changes in the port number allocated to the packet to be forwarded. More specifically, forwarding restrictions are more stringent when the port number is changed at random than when the port number is changed based on a predetermined regularity.

After the NAT type of the NAT device has been determined at step S133, a registration request packet that includes the determined NAT type in a data portion is transmitted to the communication control device 14 (step S135). Monitoring is performed to monitor reception of a key notification packet transmitted from the communication control device 14 in response to the transmitted registration request packet (step S137). The key notification packet is transmitted from the communication control device 14 at step S105 (refer to FIG. 11). In a case where the key notification packet from the communication control device 14 has not been received even after a predetermined time period has elapsed (no at step S137), the processing advances to step S168 (refer to FIG. 18).

In a case where the key notification packet transmitted from the communication control device 14 has been received (yes at step S137), an identifier key included in a data portion of the received key notification packet is stored in the RAM 63 (step S139).

In order to start the normal determination processing, a start flag is switched on (step S141). The processing advances to step S168 (refer to FIG. 18). In the normal determination processing (refer to FIG. 20, to be described later), when a multi-stage determination request packet transmitted from the communication control device 14 is received, communication is performed with another one of the terminal devices that is subordinate to the same NAT device. This will be explained in more detail later.

Figure 18:
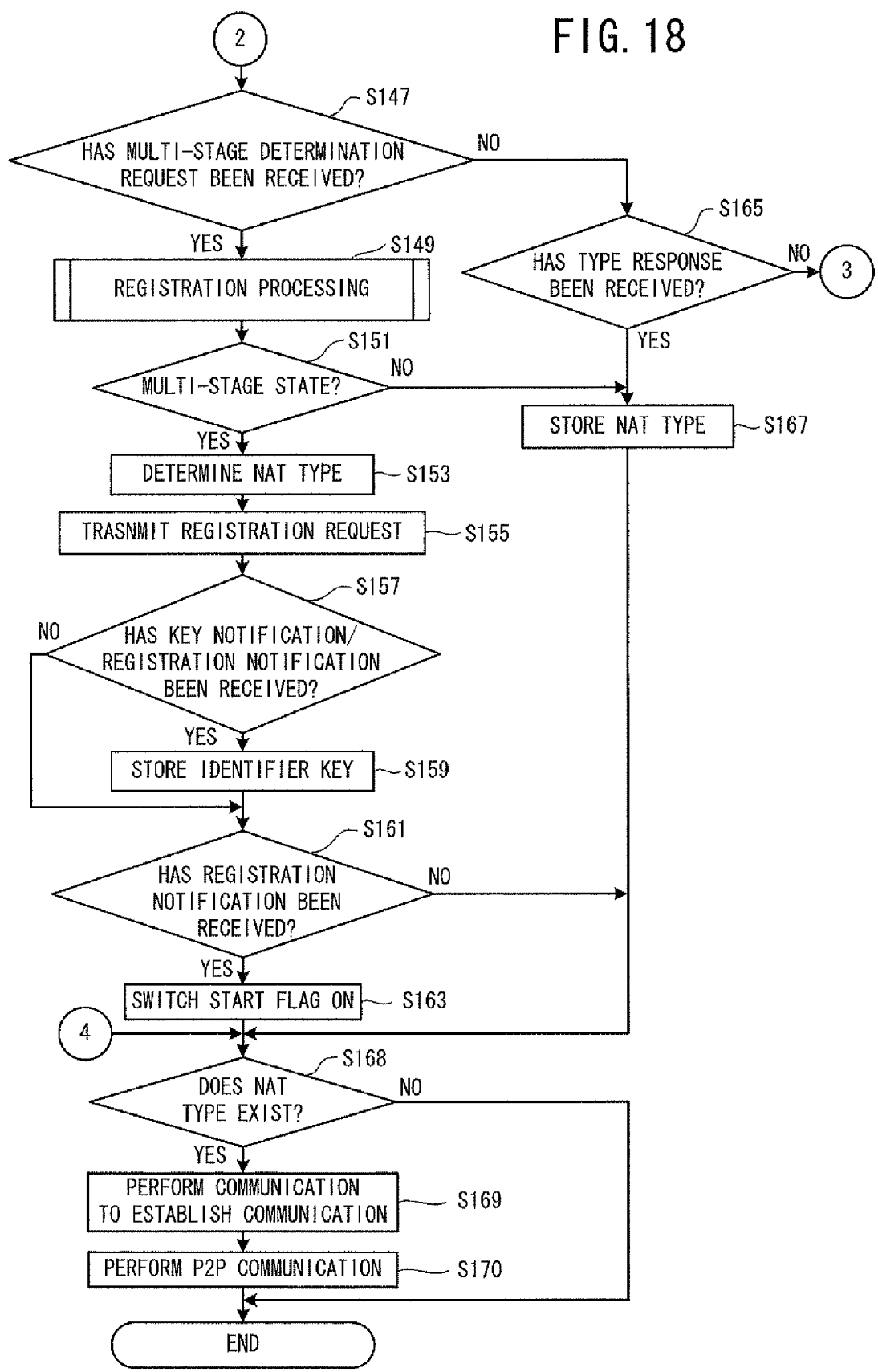
FIG. 18 is a flowchart that shows the terminal device processing, continued from FIG. 17.

In a case, at step S131, the packet received from the communication control device 14 is the multi-stage determination request packet (no at step S131 and yes at step S147 (refer to FIG. 18)), registration determination processing is performed (step S149), as shown in FIG. 18. In the registration determination processing, communication result information is returned to the communication control device 14 by performing communication with another of the terminal devices that is subordinate to the same NAT device.

Figure 19:
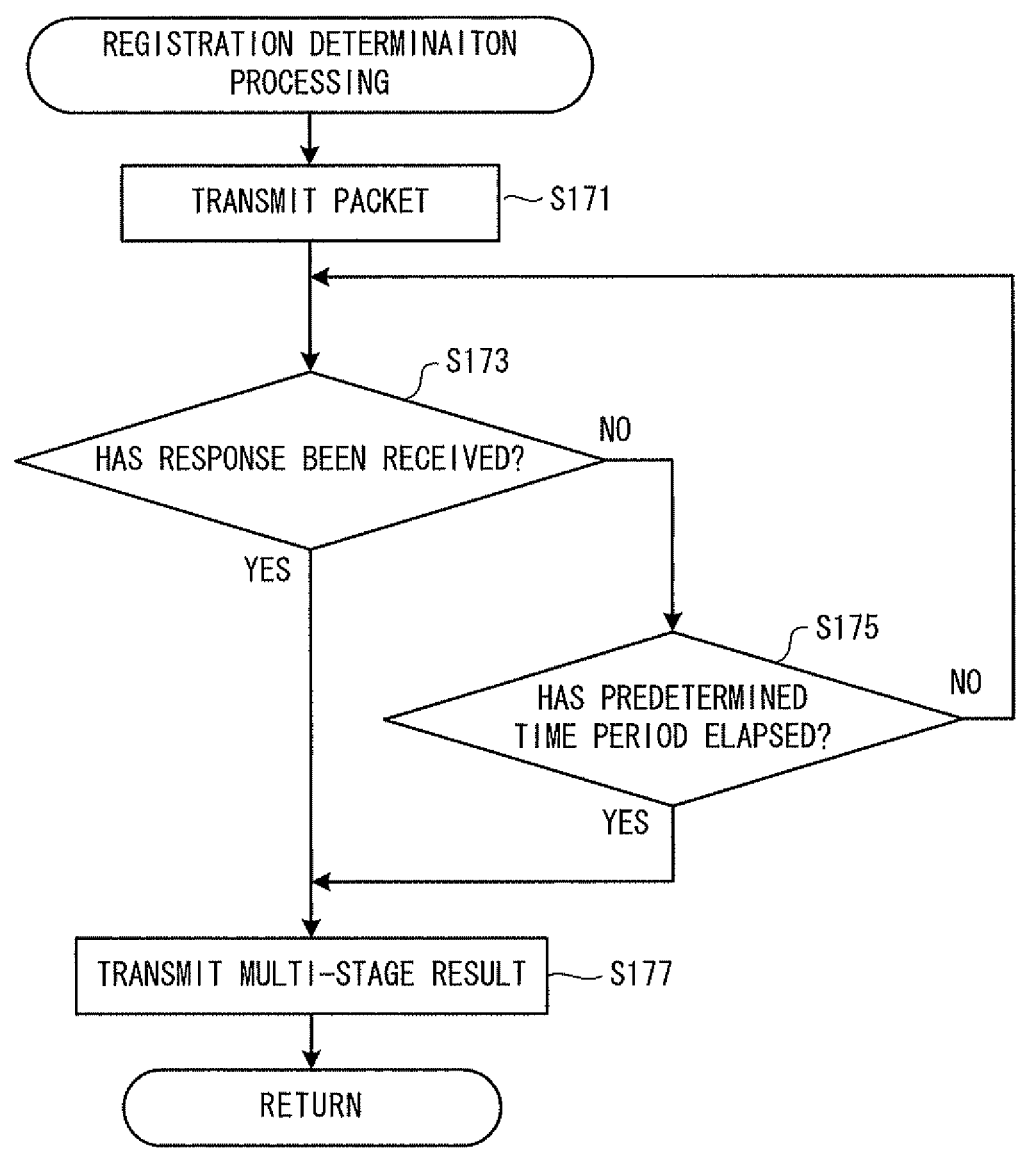
FIG. 19 is a flowchart that shows registration determination processing.

The registration determination processing will be explained with reference to FIG. 19. A packet is transmitted that is addressed to another of the terminal devices (hereinafter sometimes referred to as "partner terminal device") that is subordinate to the same NAT device (step S171). Monitoring is performed to monitor reception of a response packet that is returned from the partner terminal device to which the packet has been transmitted (step S173). In a case where the response packet has not been received from the partner terminal device (no at step S173), an elapsed time period from when the packet is transmitted to the partner terminal device is monitored (step S175). In a case where the elapsed time period is less than a predetermined time period (no at step S175), the processing returns to step S173 and reception of the response packet to be transmitted from the partner terminal device is continuously monitored. In a case where the response packet is received from the partner terminal device within the predetermined time period (yes at step S173), the processing advances to step S177. In a case where the elapsed time period exceeds the predetermined time period (yes at step S175), the processing advances to step S177.

As a result of the communication performed with the partner terminal device at step S171 to step S175, information indicating whether or not the response packet has been received is stored in a data portion of a multi-stage result packet. The multi-stage result packet that includes the communication result information in the data portion is transmitted to the communication control device 14 (step S177). The registration determination processing is terminated and the processing returns to the terminal device processing (refer to FIG. 18). In the communication control device 14, a determination is made as to whether or not the terminal device is in the multi-stage state, based on the multi-stage result packet received at step S91 (refer to FIG. 10). In a case where it is determined that the terminal device is in the multi-stage state, in the communication control device 14, a determination request packet is transmitted at step S95 (refer to FIG. 10). In a case where it is determined that the terminal device is not in the multi-stage state a type request packet is transmitted by the communication control device 14 at step S97 (refer to FIG. 10).

As shown in FIG. 18, after the registration determination processing (step S149), a packet transmitted by the communication control device 14 is received by the terminal device.

A determination is made as to whether or not the terminal device itself is in the multi-stage state, based on the received packet. In a case where a type response packet has been received from the communication control device 14, it is determined that the terminal device itself is not in the multi-stage state (no at step S151). The NAT type included in a data portion of the received type response packet is stored in the RAM 63 (step S167). The processing advances to step S168.

In a case where a determination request packet has been received from the communication control device 14, it is determined that the terminal device itself is in the multi-stage state (yes at step S151). Processing to determine the NAT type is performed (step S153). Determination of the NAT type is performed by a same method as that at step S133 (refer to FIG. 17), for example. In this way, of the NAT types of the NAT devices located on the path between the terminal device itself and the communication control device 14, the NAT type with the most stringent forwarding restrictions is determined. A registration request packet is transmitted to the communication control device 14 (step S155). The registration request packet notifies the communication control device 14 of the determined NAT type. The NAT type determined at step S153 is stored in a data portion of the registration request packet.

After the registration request packet has been transmitted, monitoring is performed to monitor reception of a key notification packet transmitted from the communication control device 14 (step S157). The key notification packet is transmitted from the communication control device 14 at step S105 (refer to FIG. 11). The registration notification packet is transmitted from the communication control device 14 at step S110 (refer to FIG. 11). In a case where the key notification packet is received, the NAT type has already been registered in the NAT table of the communication control device 14 by another of the terminal devices that is subordinate to the same NAT device. Namely, the NAT type that is registered in the NAT table is the same as the NAT type determined at step S153. In a case where the registration notification packet is received, the NAT type has been registered in the NAT table of the communication control device 14 by another of the terminal devices that is subordinate to the same NAT device, but the NAT type registered in the NAT table is different to the NAT type determined at step S153. In this case, the NAT type is newly registered in the communication control device 14, based on the registration request packet transmitted at step S155.

In a case where the key notification packet or the registration notification packet has been received (yes at step S157), the identifier key included in the data portion of the packet is stored in the RAM 63 (step S159). The processing advances to step S161. In a case where neither the key notification packet nor the registration notification packet has been received even if the predetermined time period or more has elapsed (no at step S157), the processing advances to step S161.

A determination is made as to whether or not the registration notification packet transmitted by the communication control device 14 has been received at step S157 (step S161). In a case where the registration notification packet has been received (yes at step S161), the NAT type is newly registered on the communication control device 14. In order to start normal determination processing, a start flag is switched on (step S163). The processing advances to step S168. In a case where the registration notification packet has not been received (no at step S161), the processing advances immediately to step S168.

If, at step S147, it is determined that the packet received from the communication control device 14 is not a multi-stage determination request packet (no at step S147) and it is determined that the packet is a type response packet (yes at step S165), the NAT type included in a data portion of the type response packet received from the communication control device 14 is stored in the RAM 63 (step S167). The processing advances to step S168. In a case where the packet received from the communication control device 14 is none of the determination request packet, the multi-stage determination request packet and the type response packet (no at step S165), the processing returns to step S127 (refer to FIG. 17).

At step S168, a determination is made as to whether or not the NAT type is stored in the RAM 63 (step S168). In a case where the NAT type is stored in the RAM 63 (yes at step S168), a method to establish communication that is required to start P2P communication is selected based on the stored NAT type. The method to establish communication is selected by referring to a list on which the NAT type is associated with the method to establish communication. The list is stored in the HDD 64 of the terminal device. UDP hole punching or UDP multi-hole punching etc. is selected as the method to establish communication, for example. Based on the method selected by referring to the list, communication with the partner terminal device is performed via the NAT device (step S169). A state is achieved in which P2P communication with the partner terminal device is possible, and P2P communication is performed (step S170). The terminal device processing is terminated.

Figure 20:
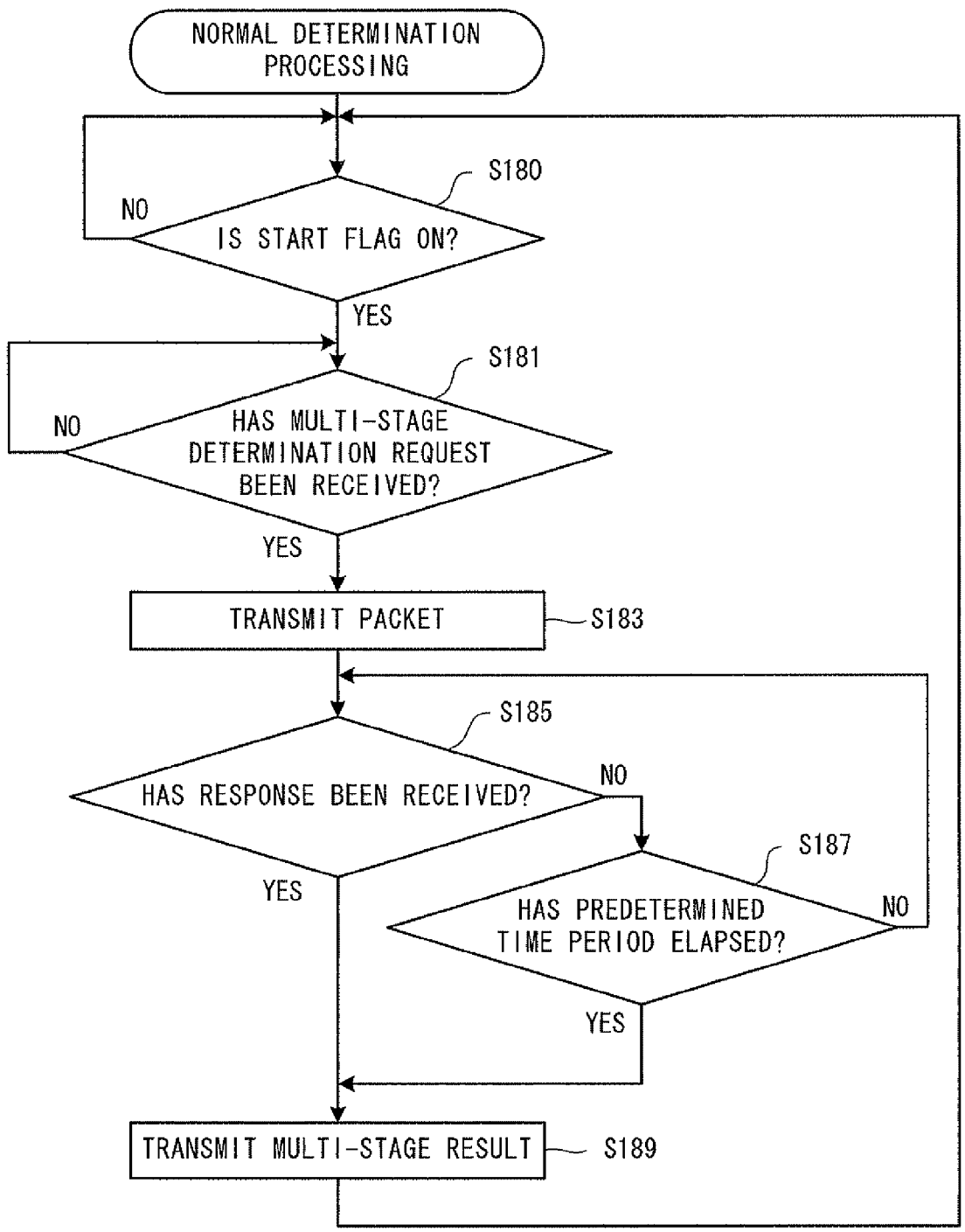
FIG. 20 is a flowchart that shows normal determination processing.

The normal determination processing will be explained with reference to FIG. 20. In the normal determination processing, communication is performed between the terminal devices that are subordinate to the same NAT device, and the communication result information is returned to the communication control device 14. The start flag is referred to (step S180). In a case where the start flag is off (no at step S180), the processing returns to step S180. The start flag is switched on at step S141 (refer to FIG. 17) and at step S163 (refer to FIG. 18).

In a case where the start flag is switched on (yes at step S180), a determination is made as to whether or not the multi-stage determination request packet has been received (step S181). In a case where the multi-stage determination request packet has not been received (no at step S181), the processing returns to step S181.

In a case where the multi-stage determination request packet transmitted from the communication control device 14 (step S37, (refer to FIG. 9)) has been received (yes at step S181), a packet is transmitted that is addressed to the partner terminal devices (step S183). Monitoring is performed to monitor reception of a response packet returned from the partner terminal device (step S185). In a case where the response packet has not been received (no at step S185), monitoring is performed to monitor an elapsed time period from when the packet was transmitted (step S187). In a case where the elapsed time period from when the packet was transmitted is less than a predetermined time period (no at step S187), the processing returns to step S185. In a case where the response packet transmitted from the partner terminal device is received within the predetermined time period (yes at step S185), the processing advances to step S189. In a case where the elapsed time period becomes equal to or more than the predetermined time period (yes at step S187), the processing advances to step S189.

As a result of performing communication with the partner terminal device at step S181 to step S187, information indicating whether or not the response packet has been received is stored in a data portion of a multi-stage result packet as the communication result information. The multi-stage result packet that includes the communication result information in the data portion is transmitted to the communication control device 14 (step S189). The processing returns to step S180. Based on the multi-stage result packet, at step S91 (refer to FIG. 10), it is determined in the communication control device 14 whether or not the terminal device is in the multi-stage state.

As described above, the terminal devices 6 to 9 can acquire the NAT type from the communication control device 14 and can thus rapidly identify the NAT type. The terminal devices 6 to 9 can start P2P communication with another of the terminal devices 6 to 9 in a short period of time. As processing to identify the NAT type is not necessary on the terminal devices 6 to 9, the terminal devices 6 to 9 can identify the NAT type without causing a processing load. The terminal devices 6 to 9 can inhibit an increase in traffic on the LANs 11 to 13 and on the Internet 10.

The terminal devices 6 to 9 determine the NAT type and notify the communication control device 14, and the communication control device 14 stores the notified NAT type. The communication control device 14 does not directly identify the NAT type, thus reducing the processing load on the communication control device 14. The NAT type is stored in association with an IP address, and thus the communication control device 14 can easily retrieve the NAT type based on a source IP address of a type request packet.

The communication control device 14 can ascertain the terminal device that is subordinate to the same NAT device using an identifier key. By using the identifier key as a retrieval key, the communication control device 14 can easily retrieve the NAT type. Even when setting information (the IP address etc.) of the terminal devices 6 to 9 has been changed, the communication control device 14 can retrieve the NAT type by using the identifier key as the retrieval key.

The communication control device 14 can detect the terminal device that is in a multi-stage state. The communication control device 14 can accurately determine the NAT type even when the terminal device is in the multi-stage state. The terminal devices 6 to 9 can reliably perform P2P communication with another of the terminal devices 6 to 9.

The present disclosure is not limited to the embodiment that is described above, and various modifications are possible. In the embodiment that is described above, the terminal devices 6 to 9 perform communication with the communication control device 14 via the NAT devices 3 to 5 and identify the NAT type. In a case where it is possible for the terminal devices 6 to 9 to acquire the NAT type by direct inquiry to the NAT devices 3 to 5, the NAT type may be determined by direct inquiry to the NAT devices 3 to 5. The terminal devices 6 to 9 can acquire the NAT type directly from the NAT devices 3 to 5 and thus the NAT type can be easily and accurately identified. It is possible to reduce a time required until the terminal devices 6 to 9 identify the NAT type.

In the embodiment that is described above, the communication control device 14 acquires a communication status of the terminal device by inquiry to the communication management device 15. The communication control device 14 may ascertain the communication status of the terminal device by performing communication directly with the terminal device.

A determination method used when the terminal device determines the NAT type is not limited to the above-described method. A separate management server may be provided within the system. The terminal device may determine the NAT type by performing communication with the management server via the NAT device.

When performing communication between a plurality of the terminal devices that are subordinate to the same NAT device, the communication may be performed by a PING command, for example.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication system comprising:
    a terminal device that is subordinate to a NAT device, the NAT device being provided with a network address translation (NAT) function; and
    a communication control device configured to be connectable to the NAT device via an external network,
    wherein the communication control device comprises:
    a memory configured to store computer-readable instructions; and
    a processor that is configured to execute the computer-readable instructions to:
        first receive, from the terminal device, a type request signal that requests acquisition of type information of the NAT device to which the terminal device is subordinate, the type information being information that classifies the NAT device;
        first determine, in a case where the type request signal is received by the first receiving, whether a NAT address matching a source IP address of the type request signal is stored in a first storage unit, the NAT address being stored in the first storage unit in association with the type information and being a global IP address of the NAT device, the first storage unit storing usability information indicating whether it is possible to use the NAT address and the type information that are associated with each other and stored, the usability information being associated with the NAT address and the type information, the first determining including determining i) whether the NAT address matching the source IP address is stored in the first storage unit and ii) whether the usability information indicating that it is possible to use is associated with the NAT address matching the source IP address; and
        first transmit, in a case where it is determined by the first determining that the NAT address matching the source IP address is stored in the first storage unit, the type information associated with the NAT address matching the source IP address to the terminal device that has transmitted the type request signal, the first transmitting including transmitting the type information in a case where it is determined by the first determining (i) that the NAT address matching the source IP address is stored in the first storage unit and (ii) that the usability information indicating that it is possible to use is associated with the NAT address matching the source IP address, and
    the terminal device comprises:
    a memory configured to store computer-readable instructions; and
    a processor that is configured to execute the computer-readable instructions stored in the memory of the terminal device to:

second transmit the type request signal to the communication control device;

second receive the type information transmitted from the communication control device in response to the type request signal transmitted by the second transmitting; and perform, in a case where the type information has been received by the second receiving, Peer to Peer communication with another terminal device that is subordinate to another NAT device by performing communication using a method to establish communication, the method being determined based on the received type information.

2. The communication system according to claim 1, wherein:

the processor of the communication control device further executes the computer-readable instructions stored in the memory of the communication control device to:

third transmit, in a case where it is determined by the first determining that the NAT address matching the source IP address is not stored in the first storage unit, to the terminal device that has transmitted the type request signal, an identification request signal that requests identification of the type information of the NAT device to which the terminal device that has transmitted the type request signal is subordinate;

third receive the type information that is transmitted from the terminal device in response to the identification request signal transmitted by the third transmitting; and first store, in the first storage unit, as the NAT address, a source IP address of the type information received by the third receiving, the NAT address being stored in association with the received type information, and the processor of the terminal device further executes the computer-readable instructions stored in the memory of the terminal device to:

fourth receive the identification request signal transmitted from the communication control device;

first identify, in a case where the identification request signal has been received by the fourth receiving, the type information of the NAT device to which the terminal device is subordinate; and fourth transmit, in a case where the type information has been identified by the first identifying, the identified type information to the communication control device.

3. The communication system according to claim 2, wherein the first identifying includes identifying the type information by performing communication with the NAT device to which the terminal device is subordinate.

4. The communication system according to claim 3, wherein the first identifying includes identifying the type information by performing communication with the communication control device via the NAT device.

5. The communication system according to claim 2, wherein:

the third transmitting includes transmitting the identification request signal in the case where it is determined by the first determining that the NAT address matching the source IP address is stored in the first storage unit and that the usability information indicating that it is impossible to use the NAT address is associated with the NAT address matching the source IP address.

6. The communication system according to claim 1 further comprising a management device configured to be connectable to the external network and storing a communication state realized by the communication control unit between the terminal devices, wherein:

the processor of the communication control device further executes the computer-readable instructions stored in the memory of the communication control device to:

acquire the communication state from the management device; and first update, based on the communication state acquired by the acquiring, the usability information stored in the first storage unit, such that in a case where it is determined that communication between the terminal devices is in progress, to usable the usability information that is associated with the NAT address of the NAT device to which the terminal device that perform communication is subordinate, and such that, in a case where it is determined that the communication between the terminal devices has ended, to not usable the usability information that is associated with the NAT address of the NAT device to which the terminal device that has ended the communication is subordinate.

7. The communication system according to claim 5, wherein:

the first storage unit stores distinguishing information that distinguishes the terminal devices that are subordinate to the NAT device in a case where another NAT devices are exist, the distinguishing information being stored in association with the NAT address and the type information; and the processor of the communication control device further executes the computer-readable instructions stored in the memory of the communication control device to:

fifth transmit, in a case where the type information has been received by the third receiving, the distinguishing information associated with the received type information to the terminal device that has transmitted the type information, and the processor of the terminal device further execute the computer-readable instructions stored in the memory of the terminal device to:

fifth receive the distinguishing information that is transmitted from the communication control device; and second store, in a second storage unit, the distinguishing information received by the fifth receiving.

8. The communication system according to claim 7, wherein:

the second transmitting includes transmitting, in a case where the distinguishing information is stored in the second storage unit, the type request signal and the distinguishing information to the communication control device;

the first receiving includes receiving the type request signal and the distinguishing information;

the first determining includes determining whether the NAT address matching the source IP address of the type request signal received by the first receiving is stored in the first storage unit, and also determines whether the received distinguishing information is the distinguishing information that is stored in the first storage unit in association with the NAT address matching the source IP address; and the first transmitting includes transmitting, in a case where it is determined by the first determining that the NAT address matching the source IP address is stored and that the received distinguishing information is the distinguishing information that is stored in the first storage unit in association with the NAT address matching the source IP address, the type information that is associated with the NAT address matching the source IP address and with the distinguishing information to the terminal device that has transmitted the type request signal and the distinguishing information.

9. The communication system according to claim 8, wherein:
the processor of the communication control device further executes the computer-readable instructions stored in the memory of the communication control device to:
delete, in a case where it has been determined by the first determining that the NAT address matching the source IP address is stored and that the received distinguishing information is not the distinguishing information that is stored in the first storage unit in association with the NAT address matching the source IP address, the NAT address matching the source IP address and the distinguishing information in association with the NAT address matching the source IP address; and
sixth transmit, in a case where the NAT address and the distinguishing information are deleted, the identification request signal to the terminal device that has transmitted the type request signal and the distinguishing information.

10. The communication system according to claim 8, wherein:
the processor of the communication control device further executes the computer-readable instructions stored in the memory of the communication control device to:
second update, in a case where it is determined by the first determining that the NAT address matching the source IP address is stored and that the received distinguishing information is the distinguishing information that is stored in the first storage unit in association with the NAT address matching the source IP address, to usable the usability information that is associated with the NAT address matching the source IP address.

11. The communication system according to claim 7, wherein:
the processor of the communication control device further executes the computer-readable instructions stored in the memory of the communication control device to:
seventh transmit a communication command signal to the terminal device and another terminal device that are both subordinate to the NAT device;
sixth receive communication result signals that are transmitted from the terminal device and the other terminal device in response to the communication command signals transmitted by the seventh transmitting;
analyze, based on the communication result signals received by the sixth receiving, whether another NAT device is located on a communication path between the terminal device and the other terminal device;
eighth transmit, in the case where it is determined by the analyzing that the other NAT device is located between the terminal device and the other terminal device, the identification request signal to the terminal device;
seventh receive type information transmitted in response to the identification request signal transmitted by the eighth transmitting; and
third store, in the first storage unit, the type information received by the seventh receiving, the type information being stored in association with the distinguishing information.

12. The communication system according to claim 11, wherein:
the processor of the communication control device further executes the computer-readable instructions stored in the memory of the communication control device to:
compare the type information stored in the first storage unit with the type information newly received from the other terminal device, the type information being received by the seventh receiving in association with the distinguishing information, and
fourth store, in the first storage unit, in a case where it is determined by the comparing that the type information stored in the first storage unit and the received type information are different, the received type information in the first storage unit, the received type information being associated with another distinguishing information.

13. A non-transitory computer-readable medium storing computer-readable instructions that, when executed by a processor of a communication control device, cause the processor to perform processes comprising:
first receiving a type request signal from a terminal device that is subordinate to a NAT device, the type request signal requesting acquisition of type information of the NAT device, the NAT device being provided with a network address translation (NAT) function, the type information being information that classifies the NAT device;
first determining, in a case where the type request signal is received by the first receiving, whether a NAT address matching a source IP address of the type request signal is stored in a first storage unit, the NAT address being stored in the first storage unit in association with the type information and being a global IP address of the NAT device, the first storage unit storing usability information indicating whether it is possible to use the NAT address and the type information that are associated with each other and stored, the usability information being associated with the NAT address and the type information, the first determining including determining i) whether the NAT address matching the source IP address is stored in the first storage unit and ii) whether the usability information indicating that it is possible to use is associated with the NAT address matching the source IP address; and
first transmitting, in a case where it is determined by the first determining that the NAT address matching the source IP address is stored in the first storage unit, to the terminal device that has transmitted the type request signal, the type information that is associated with the NAT address matching the source IP address, the first transmitting including transmitting the type information in a case where it is determined by the first determining (i) that the NAT address matching the source IP address is stored in the first storage unit and (ii) that the usability information indicating that it is possible to use is associated with the NAT address matching the source IP address.

14. A non-transitory computer-readable medium storing computer-readable instructions that, when executed, cause a processor of a communication control device to perform processes comprising:
first receiving, from a terminal device that is subordinate to a NAT device, a type request signal that requests acquisition of type information of the NAT device to which the terminal device is subordinate, the NAT device being provided with a network address translation (NAT) function, the type information being information that classifies the NAT device;

first determining, in a case where the type request signal is received by the first receiving, whether a NAT address matching a source IP address of the type request signal is stored in a first storage unit, the NAT address being stored in the first storage unit in association with the type information and being a global IP address of the NAT device;

first transmitting, in a case where it is determined by the first determining that the NAT address matching the source IP address is stored in the first storage unit, the type information associated with the NAT address matching the source IP address to the terminal device that has transmitted the type request signal;

second transmitting, in a case where it is determined by the first determining that the NAT address matching the source IP address is not stored in the first storage unit, to the terminal device that has transmitted the type request signal, an identification request signal that requests identification of the type information of the NAT device to which the terminal device that has transmitted the type request signal is subordinate;

second receiving the type information that is transmitted from the terminal device in response to the identification request signal transmitted by the second transmitting; and first storing, in the first storage unit, as the NAT address, a source IP address of the type information received by the second receiving, the NAT address being stored in association with the received type information.

* * * * *